United States Patent
Ueki et al.

(10) Patent No.: US 10,513,091 B2
(45) Date of Patent: Dec. 24, 2019

(54) DAYLIGHTING DEVICE

(71) Applicant: SHARP KABUSHIKI KAISHA, Sakai, Osaka (JP)

(72) Inventors: Shun Ueki, Sakai (JP); Shumpei Nishinaka, Sakai (JP); Toru Kanno, Sakai (JP); Daisuke Shinozaki, Sakai (JP); Tsuyoshi Kamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/738,382

(22) PCT Filed: Jun. 22, 2016

(86) PCT No.: PCT/JP2016/068506
§ 371 (c)(1),
(2) Date: Dec. 20, 2017

(87) PCT Pub. No.: WO2016/208619
PCT Pub. Date: Dec. 29, 2016

(65) Prior Publication Data
US 2018/0170012 A1 Jun. 21, 2018

(30) Foreign Application Priority Data
Jun. 24, 2015 (JP) .............................. 2015-126829

(51) Int. Cl.
| | |
|---|---|
| B32B 17/10 | (2006.01) |
| C03C 27/06 | (2006.01) |
| F21S 11/00 | (2006.01) |
| F21V 3/02 | (2006.01) |
| F21V 3/04 | (2018.01) |

(Continued)

(52) U.S. Cl.
CPC .... B32B 17/10009 (2013.01); B32B 17/1055 (2013.01); C03C 4/0092 (2013.01); C03C 27/06 (2013.01); F21S 11/002 (2013.01); F21V 3/02 (2013.01); F21V 3/049 (2013.01); F21V 5/04 (2013.01)

(58) Field of Classification Search
CPC ...................................................... F21S 11/00
See application file for complete search history.

(56) References Cited

U.S. PATENT DOCUMENTS

2014/0104689 A1* 4/2014 Padiyath ............ G02B 5/0242
359/592

FOREIGN PATENT DOCUMENTS

| CN | 103460082 A | 12/2013 |
|---|---|---|
| JP | H05-083287 U | 11/1993 |

(Continued)

*Primary Examiner* — Ian A Rummel
(74) *Attorney, Agent, or Firm* — ScienBiziP, P.C.

(57) ABSTRACT

Provided is a daylighting device (10) that is used by being attached to a window frame (110) supporting an existing window glass (100) and that includes a first base (11) being light-transmissive, a first spacer (12) provided at an outer edge of one surface (11a) of the first base (11) and attached to the window frame (110), and a daylighting member (13) provided on a side of the one surface (11a) of the first base (11), in which the daylighting member (13) includes a second base (14) that is light-transmissive and a plurality of protrusion daylighting portions (15) that are light-transmissive and provided to be adjacent to each other on a side of one surface (14a) of the second base (14).

6 Claims, 15 Drawing Sheets

(51) Int. Cl.
  *F21V 5/04*        (2006.01)
  *C03C 4/00*        (2006.01)

(56) References Cited

FOREIGN PATENT DOCUMENTS

| | | | |
|---|---|---|---|
| JP | 2002-226237 | A | 8/2002 |
| JP | 4003908 | B | 11/2007 |
| TW | 201409097 | A | 3/2014 |
| WO | 2012/134787 | A2 | 10/2012 |

* cited by examiner

DAYLIGHTING DEVICE

TECHNICAL FIELD

The present invention relates to a daylighting device.

This application claims priority based on Japanese Patent Application No. 2015-126829 filed in the Japanese Patent Office on Jun. 24, 2015, the content of which is incorporated herein.

BACKGROUND ART

Heat transfer causes various problems of reducing comfort in a building, such as reduction in an air conditioning effect and occurrence of dew condensation. Heat is most easy to transfer on a window in the building. Thus, a multiple glass having high heat insulating properties is desired to be installed on the window. As the multiple glass, a multiple glass in which a glass on the outside of a house of a pair of glass plates has a daylighting sheet provided on a surface thereof facing a glass on the inside of the house and the glass on the inside of the house has a low-emissivity (Low-E) film provided on a surface thereof facing the glass on the outside of the house (for example, refer to PTL 1) has been known. Such a multiple glass is assumed to be applied to a new building and is hard to be applied to an existing building.

Thus, proposed is a retrofit window that achieves performance equivalent to that of a Low-E (low-emissivity) pair glass only by directly attaching the Low-E glass onto an existing window (for example, refer to PTL 2).

CITATION LIST

Patent Literature

PTL 1: Japanese Unexamined Patent Application Publication No. 2002-226237
PTL 2: Japanese Patent No. 4003908

SUMMARY OF INVENTION

Technical Problem

Conventionally, in order to introduce a multiple glass provided with a daylighting sheet, a structure around a window, a dedicated sash, and the like need to be designed in advance. Alternatively, in order to introduce the multiple glass, a large-scale construction work of replacing a whole glass or sash is required. Thus, there is a problem of an increase in the cost. Such a problem prevents spread of the multiple glass. The Low-E film is vulnerable to water and is gradually deteriorated through exposure to the atmosphere. Thus, there is a problem that the Low-E film is deteriorated and does not function by the time the Low-E glass is attached to the existing window.

The invention was made in view of the aforementioned circumstances and an object thereof is to provide a daylighting device that enables introduction of a daylighting system and a multiple glass structure only by being attached to an existing window glass or a window frame that supports the window glass.

Solution to Problem

A daylighting device of an aspect of the invention is used by being attached to at least any one of an existing window glass and a window frame that supports the window glass, and includes: a first base that is light-transmissive; a first spacer that is provided at an outer edge of a surface of the first base, the surface of which faces the window glass, and that is attached to at least any one of the window glass and the window frame; and a daylighting member that is provided on a side of the surface of the first base, the surface of which faces the window glass, in which the daylighting member includes a second base that is light-transmissive, and a plurality of protrusion daylighting portions that are light-transmissive and provided to be adjacent to each other on a side of a surface of the second base, the surface of which faces at least the window glass.

In the daylighting device of the aspect of the invention, a Low-E film may be formed between the first base and the daylighting member.

In the daylighting device of the aspect of the invention, the Low-E film may be covered with the daylighting member on the surface of the first base, the surface of which faces the window glass.

In the daylighting device of the aspect of the invention, a gas barrier layer may be stacked on a surface of the daylighting member, the surface of which faces the Low-E film.

In the daylighting device of the aspect of the invention, a light scattering unit that scatters light in a direction vertical to an up-and-down direction of the window glass may be provided at a position, at which the light scattering unit faces the daylighting member, on a side of a surface opposite to the surface of the first base, the surface of which faces the window glass.

The daylighting device of the aspect of the invention may include a light scattering device that has a third base being light-transmissive, a second spacer provided at an outer edge of the third base, the surface of which faces the first base, and a light scattering unit, in which the light scattering device may be attached, via the second spacer, to the surface opposite to the surface of the first base, the surface of which faces the window glass, so that the light scattering unit faces the first base.

In the daylighting device of the aspect of the invention, the light scattering unit may be constituted by a fine unevenness formed on the surface opposite to the surface of the first base, the surface of which faces the window glass, and the fine unevenness may be formed along a direction that is an up-and-down direction of the first base when the first base is attached to at least any one of the window glass and the window frame via the first spacer.

In the daylighting device of the aspect of the invention, the light scattering unit may be constituted by a plurality of convex lenses provided to be parallel and adjacent to each other on the surface opposite to the surface of the first base, the surface of which faces the window glass, and the plurality of convex lenses may be provided along a direction that is an up-and-down direction of the first base when the first base is attached to at least any one of the window glass and the window frame via the first spacer.

Advantageous Effects of Invention

According to some aspects of the invention, it is possible to provide a daylighting device that enables introduction of a daylighting system and a multiple glass structure only by being attached to an existing window glass or a window frame that supports the window glass.

DESCRIPTION OF EMBODIMENTS

Embodiments of a daylighting device of the invention will be described.

Note that, the embodiments will be described specifically for better understanding of the spirit of the invention, and do not limit the invention unless particularly stated. Further, for convenience, the drawings used in the following description illustrate parts that constitute a main portion in an enlarged manner to allow better understanding of features of the invention in some cases, and dimensional ratios and the like of the components cannot be said to be the same as actual ones.

[Embodiment 1]
(Daylighting Device)

Figure 1:
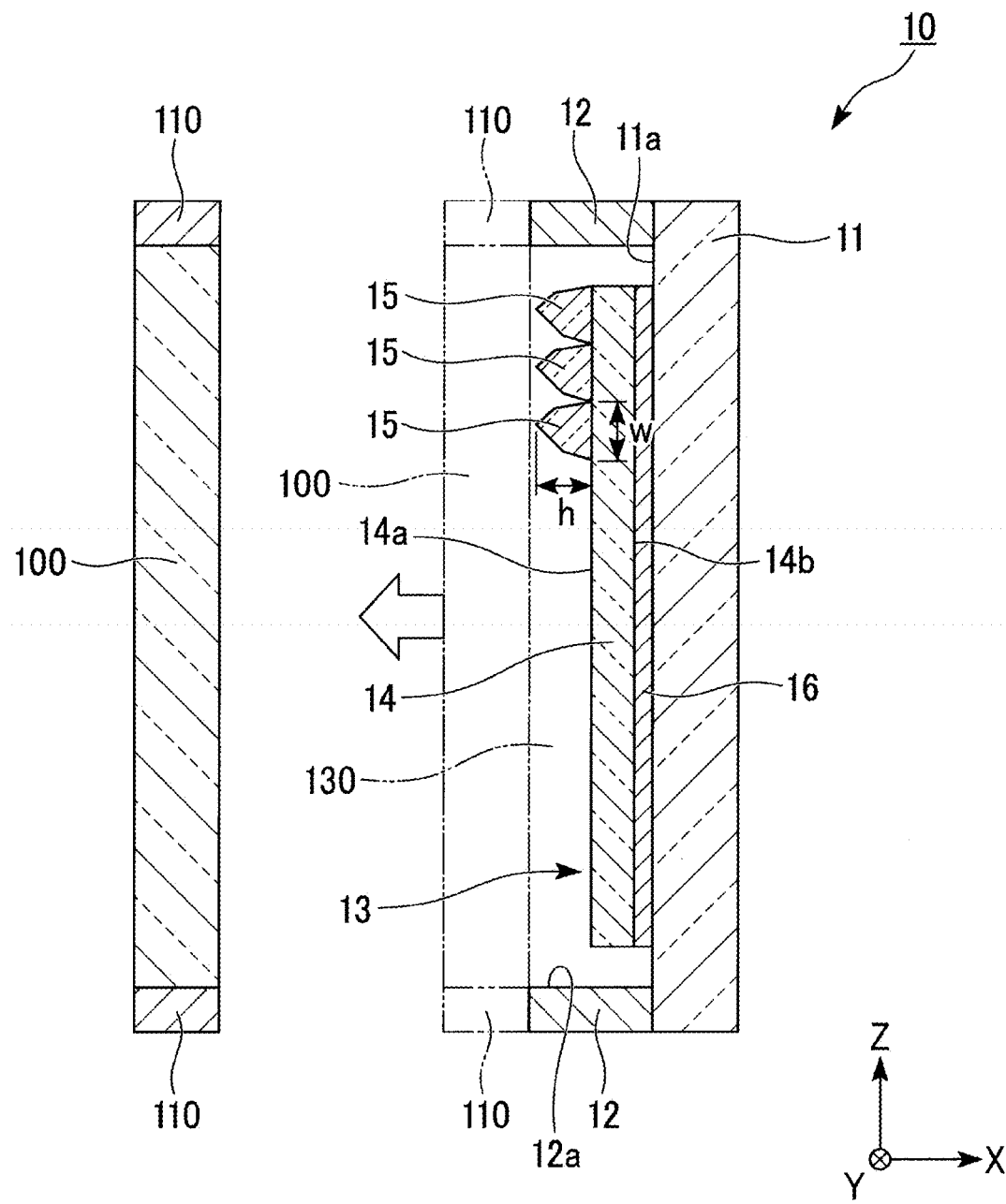
FIG. 1 is a sectional view illustrating a schematic configuration of a daylighting device that is Embodiment 1 of the invention.

FIG. 1 is a sectional view illustrating a schematic configuration of a daylighting device that is Embodiment 1 of the invention.

In FIG. 1, it is assumed that an X-direction is a normal direction of a first base of the daylighting device, a Y-direction is a direction (a width direction of the first base) orthogonal to the X-direction, and a Z-direction is a direction (a height direction of the first base) orthogonal to the X-direction and the Y-direction.

As illustrated in FIG. 1, a daylighting device 10 of the present embodiment is used by being attached to a window frame 110 that supports an existing window glass 100. The daylighting device 10 includes a first base 11 that is light-transmissive, a first spacer 12 that is provided at an outer edge of a surface (hereinafter, referred to as "one surface") 11a of the first base 11, the one surface 11a of which faces the window glass 100 (window frame 110), and that is attached to the window frame 110, and a daylighting member 13 that is provided on the one surface 11a of the first base 11. The first spacer 12 is provided over a whole (entire circumference) of the outer edge of the one surface 11a of the first base 11 and has a frame shape in plan view.

The daylighting member 13 includes a second base 14 that is light-transmissive and a plurality of protrusion daylighting portions 15 that are light-transmissive and provided to be adjacent to each other on one surface 14a of the second base 14.

The protrusion daylighting portions 15 are provided in a part of the one surface 14a of the second base 14, and the part is positioned on an upper side of the one surface 14a in a vertical direction (up-and-down direction) when the daylighting device 10 is attached to the window frame 110.

Edges of the protrusion daylighting portions 15 which are adjacent to each other are in contact.

The daylighting member 13 is provided on the one surface 11a of the first base 11 via an adhesive layer 16.

As the first base 11, for example, a rectangular base is used.

The first base 11 is not particularly limited as long as being a light-transmissive base, and a glass base, a base formed of light-transmissive resin, or the like is used, for example. As the base formed of light-transmissive resin, for example, a base formed of light-transmissive resin such as an acrylic polymer, an olefinic polymer, a vinyl-based polymer, a cellulosic polymer, an amide-based polymer, a fluorinated polymer, a urethane-based polymer, a silicone-based polymer, or an imide-based polymer is used. As the first base 11, specifically, a light-transmissive base such as a triacetyl cellulose (TAC) film, a polyethylene terephthalate (PET) film, a cycloolefin polymer (COP) film, a polycarbonate (PC) film, a polyethylene naphthalate (PEN) film, a polyethersulfone (PES) film, or a polyimide (PI) film is used.

The light-transmissive performance of the first base 11 in the present embodiment means that a total light transmittance defined by JIS K7361-1 is 90% or more. When the first base 11 has the total light transmittance of 90% or more, the first base 11 obtains sufficient transparency.

The spacer 12 is a member for keeping an interval peen the window glass 100 and the daylighting member 13 at a predetermined length so as to prevent the daylighting member 13 from contacting the window glass 100 when the daylighting device 10 is attached to the window frame 110. That is, a thickness (a length in the X-direction of FIG. 1) of the spacer 12 is appropriately adjusted in accordance with a thickness (a length in the X-direction of FIG. 1) of the daylighting member 13.

The spacer 12 is formed of an aluminum hollow material. A drying material such as granules of silica gel is included in an internal space of the spacer 12. A not-illustrated moisture absorption window is provided on an inside surface 12a of the spacer 12. As a result, when the daylighting device 10 is attached to the window frame 110, moisture in a space 130 which is formed between the daylighting device 10 and each of the window glass 100 and the window frame 110 is able to be removed by the drying material in the spacer 12.

The spacer 12 is provided on the one surface 11a of the first base 11 via a not-illustrated sealing material.

The sealing material is not particularly limited and an example thereof includes butyl rubber.

A member that absorbs less solar radiation is used as the daylighting member 13. In a case where the daylighting member 13 absorbs solar radiation, when the window glass 100 to which the daylighting member 13 is attached is exposed to the solar radiation, thermal fracture occurs in some cases. Thus, it is preferable that the daylighting member 13 absorbs as little solar radiation as possible. The solar radiation is defined by radiation of 300 nm to 2500 nm pouring from the sun. On the basis of a transmittance and a reflectance in such a wavelength range, a solar transmittance (6.4.4) and a solar reflectance (6.4.5) are calculated by a weighting coefficient defined by JIS A5759. An index (%) of solar absorption is able to be evaluated by using a value represented by the following expression (1) as an index.

$$\text{Index (\%) of solar absorption} = 100(\%) - \text{solar transmittance (\%)} - \text{solar reflectance (\%)} \quad (1)$$

That is, the index (%) of solar absorption is able to be evaluated by using, as the index, a value obtained by subtracting the solar transmittance (%) and the solar reflectance (%) from 100%.

The index (%) of solar absorption of the daylighting member 13 in the present embodiment is preferably 5(%) or less.

In measurement of a value of the index (%) of solar absorption of the daylighting member 13 in the present embodiment with use of a spectrophotometer V-770 (manufactured by JASCO Corporation) including an integrating sphere, the solar transmittance was 89.0(%), the solar reflectance was 10.5(%), and the index of solar absorption was 0.5(%).

As the second base 14, for example, a light-transmissive base formed of an acrylic polymer, an olefinic polymer, a vinyl-based polymer, a cellulosic polymer, an amide-based polymer, a fluorinated polymer, a urethane-based polymer, a silicone-based polymer, an imide-based polymer, or the like is used. As the second base 14, specifically, a light-transmissive base such as a triacetyl cellulose (TAC) film, a polyethylene terephthalate (PET) film, a cycloolefin polymer (COP) film, a polycarbonate (PC) film, a polyethylene naphthalate (PEN) film, a polyethersulfone (PES) film, or a polyimide (PI) film is used.

The light-transmissive performance of the second base 14 in the present embodiment is defined similarly to the first base 11.

Each of the protrusion daylighting portions 15 is made of an organic material that includes resin, for example, such as acryl resin, epoxy resin, or silicone resin and has light-transmissive performance and photosensitivity. As the organic material, a mixture obtained by mixing a polymerization initiator, a coupling agent, a monomer, an organic solvent, or the like into one of the resins is used. Moreover, the polymerization initiator may contain various additional components, such as a stabilizer, an inhibitor, a plasticizer, a fluorescent brightener, a mold release agent, a chain transfer agent, or any other photopolymerizable monomer. In addition, as the organic material, a light-transmissive organic material described in Japanese Patent No. 4129991 is used.

Each of the protrusion daylighting portions 15 preferably has the total light transmittance of 90% or more under the provisions of JIS K7361-1. When the protrusion daylighting portion 15 has the total light transmittance of 90% or more, the protrusion daylighting portion 15 obtains sufficient transparency.

Each of the plurality of protrusion daylighting portions 15 substantially has one direction (Y-direction) as a longitudinal direction and the one direction is parallel to one side of the second base 14 that has a rectangular shape. In the case of the present embodiment, each of the plurality of protrusion daylighting portions 15 is formed as a protrusion portion, which is extended in the Y-direction and has a stripe shape with a predetermined width. Each of the plurality of protrusion daylighting portions 15 is disposed with the longitudinal direction parallel to a direction of one side of the second base 14 that has the rectangular shape. In each of the plurality of protrusion daylighting portions 15, a shape of a cross section (X-Z cross section) parallel to a width direction of the protrusion daylighting portion 15 is a trapezoid, a triangle, or a polygon with at least five vertexes. FIG. 1 illustrates a case where the shape of the cross section parallel to the width direction of the protrusion daylighting portion 15 is pentagon.

When a width in a short-hand direction of each of the protrusion daylighting portions 15 is w, widths w of the plurality of protrusion daylighting portions 15 are all equal. The width w of each of the protrusion daylighting portions 15 is, for example, 10 μm to 1000 μm.

When a height of the protrusion daylighting portion 15 from the one surface 14a of the second base 14 (a height of the protrusion daylighting portion 15 in a normal direction (X-direction) of the second base 14) is h, the heights h of the plurality of protrusion daylighting portions 15 are all equal. The height h of each of the protrusion daylighting portions 15 is, for example, 10 μm to 1000 μm.

Examples of a material forming the adhesive layer 16 include an acrylic adhesive, a urethane-based adhesive, a polyester-based adhesive, a silicone-based adhesive, and a rubber-based adhesive. Among them, the acrylic adhesive is preferably used.

The acrylic adhesive is a polymer containing, as a main component, acrylic monomer units. An acrylic monomer may be (meth)acrylic acid, itaconic acid, (anhydrous) maleic acid, (anhydrous) fumaric acid, crotonic acid, or an alkyl ester thereof. Here, the (meth)acrylic acid generally means acrylic acid and methacrylic acid. The same is applied to a (meth)acrylate. Among acrylic monomers, one containing, as a main component, (meth)acrylic acid or its alkyl ester is preferable.

The acrylic adhesive has a functional group which can be a crosslinking agent and a crosslinking point in order to increase cohesive force thereof.

The crosslinking agent may be, for example, melamine resin, urea resin, epoxy resin, metal oxide, metal salt, metal hydroxide, metal chelate, polyisocyanate, carboxyl group-containing polymer, an acid anhydride, or polyamine. That is, a monomer having a functional group (for example, such as a hydroxyl group or a glycidyl group) which can be a crosslinking point is used as the crosslinking agent. Examples of the monomer having a functional group which can be a crosslinking point include hydroxyethyl (meth)acrylate and glycidyl (meth)acrylate.

The acrylic adhesive may contain a silane coupling agent in order to adjust adhesive force. As the silane coupling agent, an organic silicon compound having at least one alkoxysilyl group in its molecule is preferably used.

Further, the acrylic adhesive may contain an ultraviolet absorbent. Examples of the ultraviolet absorbent include a benzotriazole-based ultraviolet absorbent, a benzophenone-based ultraviolet absorbent, a salicylate-based ultraviolet absorbent, a cyanoacrylate-based ultraviolet absorbent, a triazine-based ultraviolet absorbent, an okizanirido-based ultraviolet absorbent, a nickel complex salt-based ultraviolet absorbent, and an inorganic ultraviolet absorbent.

The daylighting device 10 is attached to the window frame 110 that supports the window glass 100, so that a direction in which the protrusion daylighting portions 15 are arrayed is a vertical direction (up-and-down direction). In this case, the spacer 12 is attached to the window frame 110 via a not-illustrated sealing material.

The sealing material is not particularly limited and an example thereof includes butyl rubber.

Light coming from an upper part of the daylighting device 10 is refracted within the protrusion daylighting portions 15 and by the other surface 14b of the second base 14 and is emitted toward the upper part of the daylighting device 10. The light which is emitted toward the upper part of the daylighting device 10 is guided to a ceiling of a room or an innermost part of the room and illuminates the inside of the room brightly.

According to the daylighting device 10 of the present embodiment, only by attaching the daylighting device 10 to the window frame 110 that supports the existing window glass 100, the daylighting device 10 is able to be installed on the window glass 100.

According to the daylighting device 10 of the present embodiment, the daylighting device is able to be installed without replacing a sash. Thus, the cost to replace the sash is not required and economic efficiency is improved. Moreover, as the step of replacing the sash is able to be omitted, the step is able to be shortened and workability is improved.

A daylighting system is able to be introduced only by attaching the daylighting device 10 to the existing window glass 100. Thus, the daylighting system is able to be introduced by adding a minimal member to the window glass 100.

By forming a multiple glass structure constituted by the existing window glass 100 and the daylighting device 10, a daylighting system that is highly energy efficient and insulates heat while getting light into the room is able to be introduced.

Note that, though the case is exemplified in the present embodiment where the edges of the protrusion daylighting portions 15 which are adjacent to each other are in contact, the present embodiment is not limited thereto. In the present embodiment, the edges of the protrusion daylighting portions 15 which are adjacent to each other may be connected so that the protrusion daylighting portions 15 which are adjacent to each other have end surfaces on the second base 14 side overlapped partially. Moreover, in all the protrusion daylighting portions 15 which are adjacent to each other, the protrusion daylighting portions 15 which are adjacent to each other may not be partially in contact. For example, in a part of the protrusion daylighting portions 15 of the plurality of protrusion daylighting portions 15, a set of the protrusion daylighting portions 15 which are adjacent to each other may be partially in contact. That is, it is only required that the plurality of protrusion daylighting portions 15 have a configuration in which a set of the protrusion daylighting portions 15 which are adjacent to each other is partially in contact.

The daylighting device 10 of the present embodiment may be provided with a Low-E film or a gas barrier layer described later.

[Embodiment 2]
(Daylighting Device)

Figure 2:
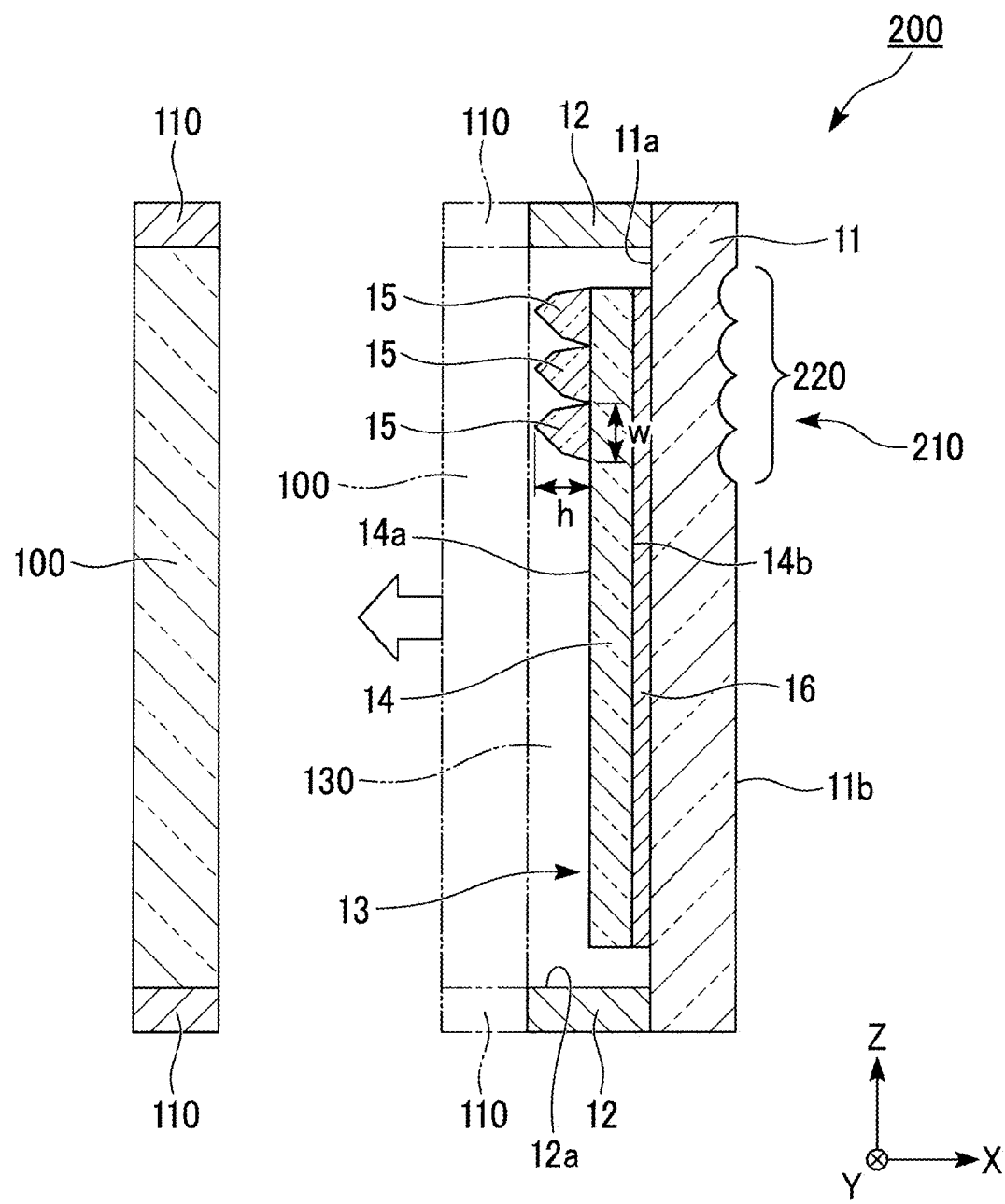
FIG. 2 is a sectional view illustrating a schematic configuration of a daylighting device that is Embodiment 2 of the invention.

FIG. 2 is a sectional view illustrating a schematic configuration of a daylighting device that is Embodiment 2 of the invention. In FIG. 2, components that are the same as those of the daylighting device of Embodiment 1 illustrated in FIG. 1 are given the same reference signs and the description thereof is omitted.

In FIG. 2, it is assumed that the X-direction is the normal direction of the first base of the daylighting device, the Y-direction is the direction (the width direction of the first base) orthogonal to the X-direction, and the Z-direction is the direction (the height direction of the first base) orthogonal to the X-direction and the Y-direction.

As illustrated in FIG. 2, a daylighting device 200 of the present embodiment is used by being attached to the window frame 110 that supports the existing window glass 100. The daylighting device 200 includes the first base 11 that is light-transmissive, the first spacer 12 that is provided at the outer edge of the one surface 11a of the first base 11 and attached to the window frame 110, the daylighting member 13 that is provided on the one surface 11a of the first base 11, and a light scattering unit 210 that is provided at a position, which faces the daylighting member 13, on a surface (hereinafter, referred to as "the other surface") 11b opposite to the surface of the first base 11, which faces the window glass 100.

The light scattering unit 210 is provided at the position, which faces the daylighting member 13, on the other surface 11b of the first base 11. The light scattering unit 210 may be provided at least at a position, which faces the protrusion daylighting portions 15 constituting the daylighting member 13, on the other surface 11b of the first base 11 as illustrated in FIG. 2.

The light scattering unit 210 scatters light in a direction vertical to the up-and-down direction of the window glass 100.

The light scattering unit 210 is constituted by a fine unevenness 220 formed on the other surface 11b of the first base 11, for example, as illustrated in FIG. 2. The fine unevenness 220 is formed along a direction that is a vertical direction (up-and-down direction) of the first base 11 when the first base 11 is attached to the window frame 110 via the first spacer 12. A method for forming the fine unevenness 220 is not particularly limited, and the fine unevenness 220 is formed by, for example, a formation method such as an etching method or a sandblasting method described later.

Figure 3:
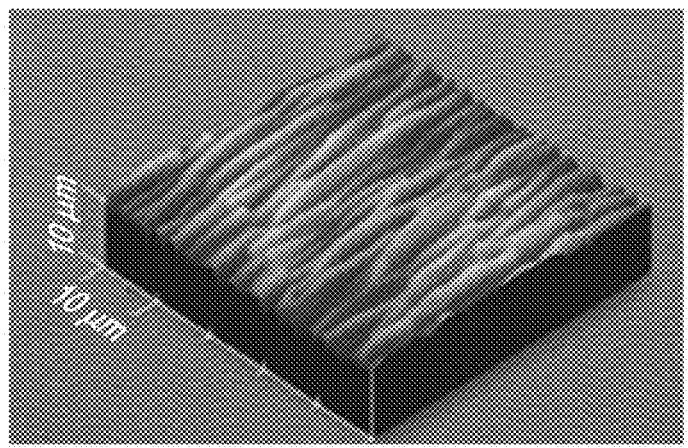
FIG. 3 is a perspective view illustrating a pseudo lenticular structure in which fine unevenness formed by an etching method is provided.

The fine unevenness 220 that is formed by the etching method provides a pseudo lenticular structure, for example, as illustrated in FIG. 3.

Figure 4:
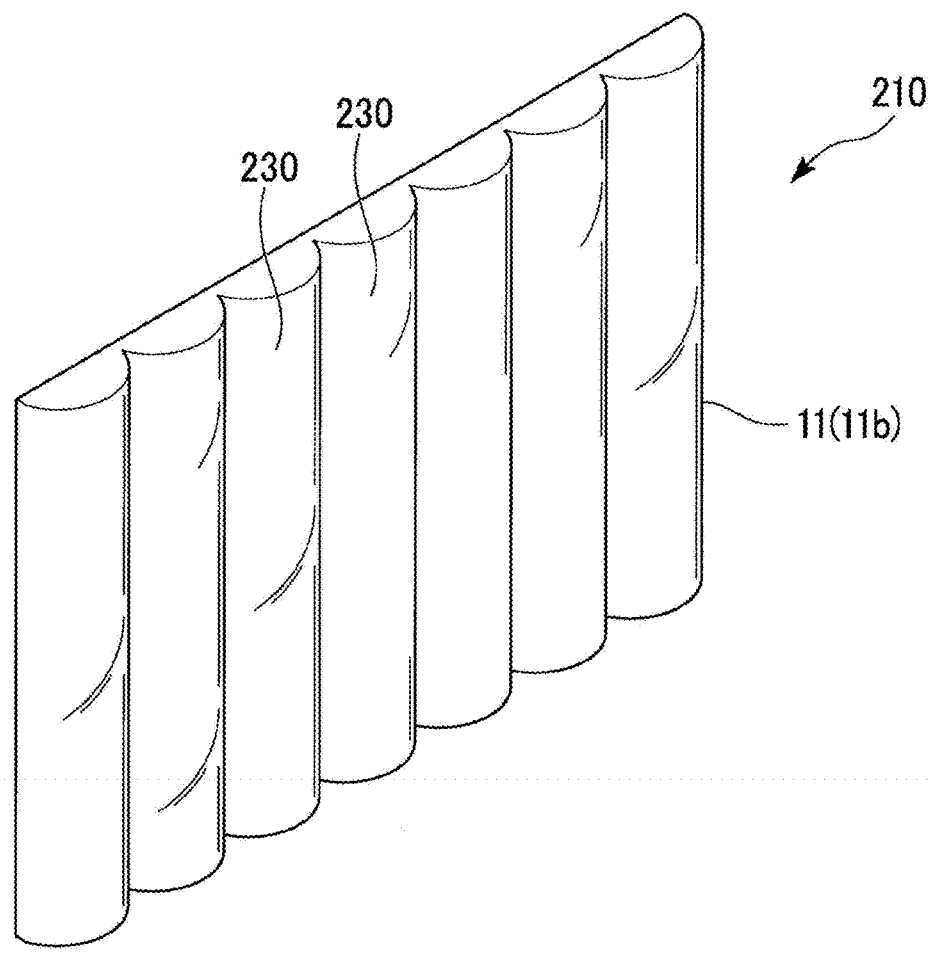
FIG. 4 is a perspective view illustrating convex lenses constituting a light scattering unit.

Moreover, the light scattering unit 210 may be constituted by a plurality of convex lenses 230 that are provided to be parallel and adjacent to each other on the other surface 11b of the first base 11 as illustrated in FIG. 4. The plurality of convex lenses 230 are formed along a direction that is the vertical direction (up-and-down direction) of the first base 11 when the first base 11 is attached to the window frame 110 via the first spacer 12. The first base 11 itself may be processed such that the convex lenses 230 are integral with the first base 11 or the convex lenses 230 may be provided separately from the first base 11.

By changing a shape or a size of each of the convex lenses 230, intensity of scattering (diffusing) light by the light scattering unit 210 is able to be changed.

As a material of the convex lens 230, for example, light-transmissive resin made of resins such as a thermoplastic polymer, thermosetting resin, and photopolymerizable resin is used. Examples of the light-transmissive rein include an acrylic polymer, an olefinic polymer, a vinyl-based polymer, a cellulosic polymer, an amide-based polymer, a fluorinated polymer, a urethane-based polymer, a silicone-based polymer, and an imide-based polymer. Specific examples of the light-transmissive resin include triacetyl cellulose (TAC), polyethylene terephthalate (PET), cycloolefin polymer (COP), polycarbonate (PC), polyethylene naphthalate (PEN), polyethersulfone (PES), and polyimide (PI).

In the present embodiment, each of the convex lenses 230 preferably has the total light transmittance of 90% or more, for example.

This makes it possible to obtain sufficient transparency.

Light diffusion patterns (uneven shape) of the convex lenses 230 are able to be formed on the other surface 11b side of the first base 11 by forming the patterns by photolithography and thereafter applying heat sag processing as necessary. Thus, it is possible to easily perform patterning for each of the convex lenses 23 and also perform formation in a large area by succeeding patterns by step and repeat.

When light diffusion performance is not applied to the daylighting device, external light (sunlight) taken by the daylighting member of the daylighting device is straightly entered into the room. Accordingly, on a day when the sunlight is directed to the daylighting device such as a clear day, the sunlight which is refracted by the daylighting member is entered into the room, and a light ray which is to be originally radiated to the ceiling is directly entered to eyes of a person in some cases (depending on an installation height of the daylighting device or a position of the sun). As the light ray directly entered to the eyes of the person in this manner is glare, the light ray is recognized as the uncomfortable glare. The sunlight is able to be considered as a point light source having extremely high brightness and directional characteristics. Thus, when the sunlight is straightly entered into the room, the sunlight is entered into the room while having the characteristics of the high brightness and high directional characteristics. In a case where the sunlight that is straightly entered into the room in this manner is entered to the eyes of the person, the person feels extremely glare.

The light scattering unit 210 is included in the daylighting device 200 as a purpose of preventing the glare described above. It is preferable that the external light including the sunlight which is entered into the daylighting device 200 is diffused before being emitted from the daylighting device 200, and is converted into soft light. When the light is diffused, the brightness in a specific direction is lowered and the glare rarely occurs. The light scattering unit 210 causes the light emitted from the daylighting device 200 to be scattered in a direction vertical to the up-and-down direction of the window glass 100. Thereby, the brightness of the light in the direction vertical to the up-and-down direction of the window glass 100 is lowered and the glare rarely occurs. When the light emitted from the daylighting device 200 is scattered in the direction vertical to the up-and-down direction of the window glass 100, an amount of the light reached an innermost part of the room is reduced, but there is an advantage that spread of the light in a direction vertical to an up-and-down direction of the room is obtained. Spreading the light in the direction vertical to the up-and-down direction of the room brings advantages that even in a case of the small window, it is possible to make entire the room bright in the direction vertical to the up-and-down direction of the room, and that even when the sunlight is entered diagonally to the window glass (room), it is possible to make a center portion of the room bright, for example.

Figure 5A:
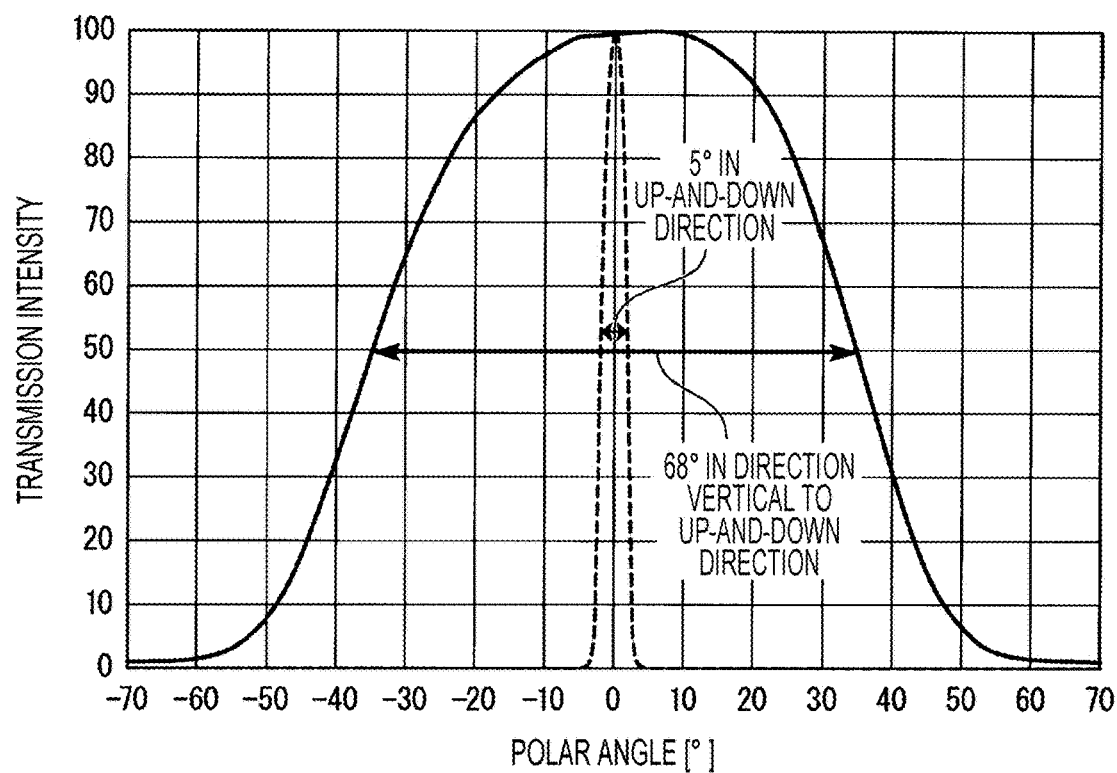
FIG. 5A is a graph indicating scattering characteristics of the light scattering unit.
Figure 5B:
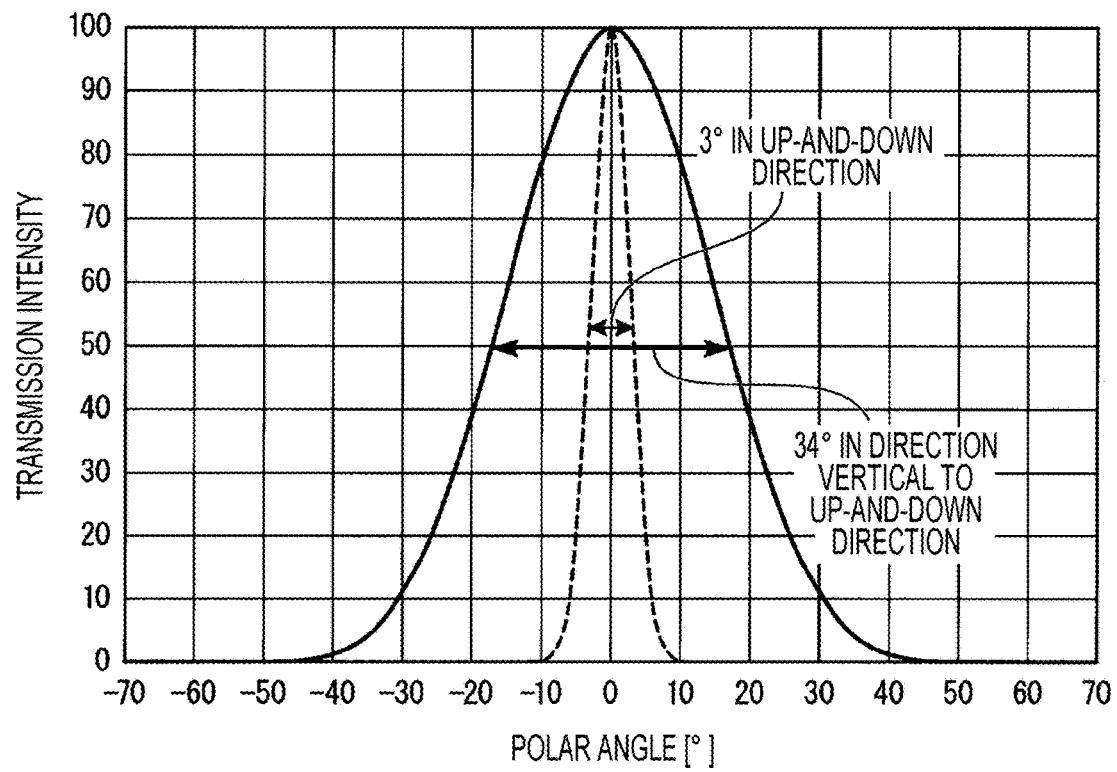
FIG. 5B is a graph indicating scattering characteristics of the light scattering unit.

FIGS. 5A and 5B are graphs indicating scattering characteristics of the light scattering unit 210 provided in the daylighting device 200 of the present embodiment. In an optical system in measurement, the tight scattering unit 210 is irradiated with light by a light source from a vertical direction, a light receiver that is provided to be opposite to the light source is moved in a polar angle direction with respect to the light scattering unit 210, the light is received by the light receiver, and transmission intensity of lighting is measured. In the graphs obtained by the measurement, the transmission intensity is set as 100 when the transmission intensity is largest.

It is preferable that a degree at which the tight scattering unit 210 in the present embodiment scatters (diffuses) the light in the direction vertical to the up-and-down direction of the window glass 100 is large. Specifically, it is more preferable that the light scattering unit 210 has a full width at half maximum of 15° or more and 70° or less in the graphs indicating scattering characteristics. When the full width at half maximum is less than 15°, the spread of the light in the direction vertical to the up-and-down direction of the window glass 100 is too small. Thus, the sunlight is not softened, directly entered to the eyes of the person, and recognized as the glare, so that it is not preferable. On the other hand, When the full width at half maximum exceeds 70°, the spread of the light in the direction vertical to the up-and-down direction of the window glass 100 is too large. This contributes to reduction in a transmission amount of the light of the light scattering unit 210, so that is it not preferable. In addition, it is preferable that a degree at which the light scattering unit 210 scatters (diffuses) the light in the up-and-down direction (ceiling direction) of the window glass 100 is small. Specifically, it is more preferable that the light scattering unit 210 has the full width at half maximum of about 10° or less in the graphs indicating scattering characteristics.

As described above, it is preferable that the degree at which the light scattering unit 210 scatters (diffuses) the light in the direction vertical to the up-and-down direction of the window glass 100 is large. However, the light scattering unit 210 preferably does not scatter (diffuse) too much light in the up-and-down direction of the window glass 100. When the light is largely scattered (diffused) in the up-and-down direction of the window glass 100, the light is diffused not only in the ceiling direction but also to a floor side. Thus, the light is directly entered to eyes of a person on the floor side and recognized as the glare. Accordingly, it is preferable that the degree at which the light scattering unit 210 scatters (diffuses) the light in the direction vertical to the up-and-down direction of the window glass 100 is large and the degree at which the light scattering unit 210 scatters (diffuses) the light in the up-and-down direction of the window glass 100 is small.

As illustrated in FIG. 5A, in the present embodiment, the light scattering unit 210 has the full width at half maximum in the direction vertical to the up-and-down direction of the window glass 100 of 68°, the light is largely diffused. On the other hand, the light scattering unit 210 has the full width at half maximum in the up-and-down direction of the window glass 100 of 5°, and the light is hardly diffused.

As illustrated in FIG. 5B, in the present embodiment, the light scattering unit 210 has the full width at half maximum in the direction vertical to the up-and-down direction of the window glass 100 of 34°, the light is largely diffused. On the other hand, the light scattering unit 210 has the full width at half maximum in the up-and-down direction of the window glass 100 of 3°, and the light is hardly diffused.

According to the daylighting device 200 of the present embodiment, only by attaching the daylighting device 200 to the window frame 110 that supports the existing window glass 100, the daylighting device 200 is able to be installed on the window glass 100.

According to the daylighting device 200 of the present embodiment, the daylighting device is able to be installed without replacing a sash. Thus, the cost to replace the sash is not required and economic efficiency is improved. Moreover, as the step of replacing the sash is able to be omitted, the step is able to be shortened and workability is improved.

A daylighting system is able to be introduced only by attaching the daylighting device 200 to the existing window glass 100. Thus, the daylighting system is able to be introduced by adding a minimal member to the window glass 100.

By forming a multiple glass structure constituted by the existing window glass 100 and the daylighting device 200, a daylighting system that is highly energy efficient and insulates heat while getting light into the room is able to be introduced.

In addition, the light scattering unit 210 is disposed at the position, which faces the daylighting member 13, on the other surface 11b of the first base 11. Thus, while the light is able to be efficiently taken on a ceiling side of the room, no glare is recognized by the person in the room.

Note that, the daylighting device 200 of the present embodiment may be provided with a Low-E film or a gas barrier layer described later.

[Embodiment 3]
(Daylighting Device)

Figure 6:
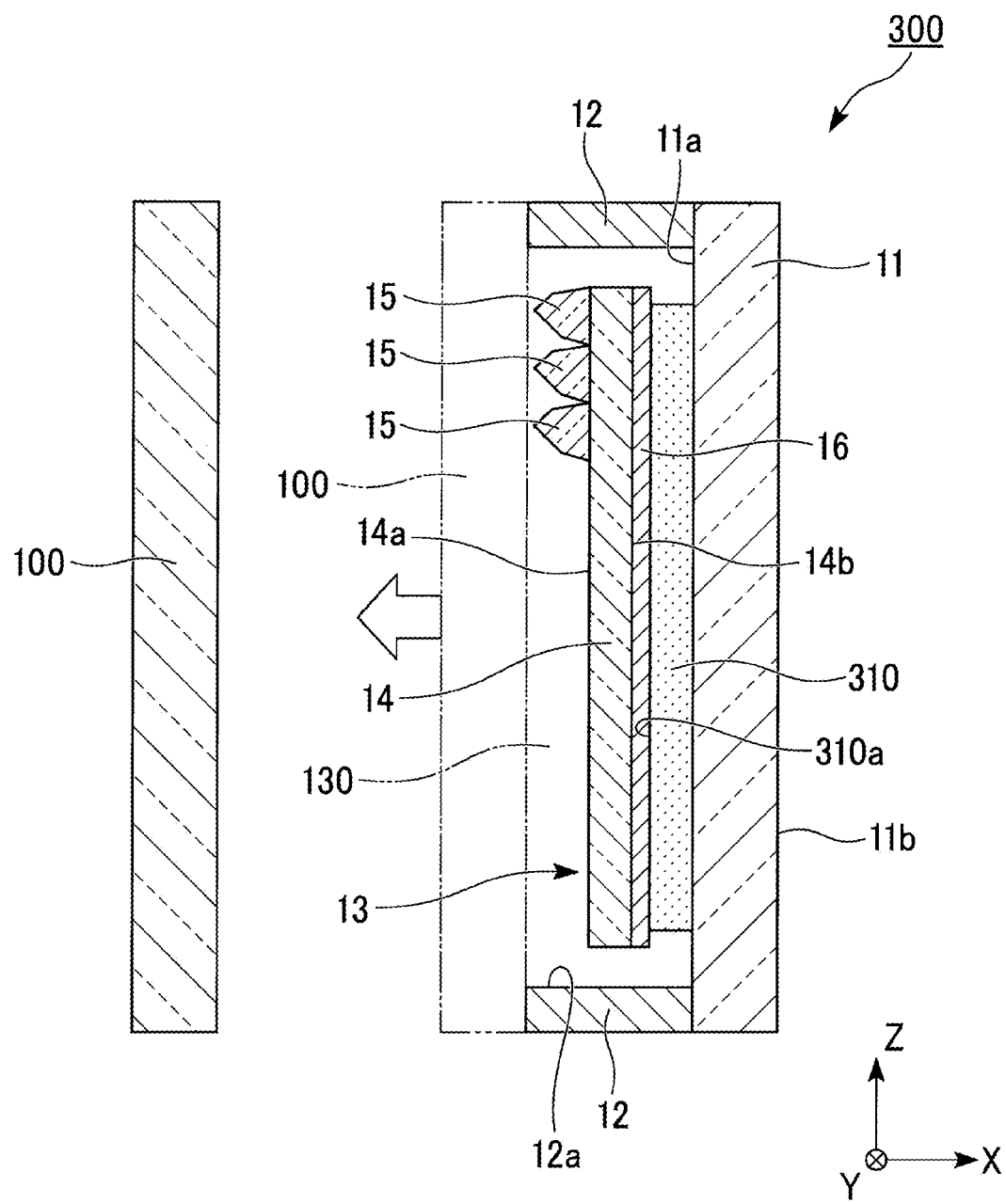
FIG. 6 is a sectional view illustrating a schematic configuration of a daylighting device that is Embodiment 3 of the invention.

FIG. 6 is a sectional view illustrating a schematic configuration of a daylighting device that is Embodiment 3 of the invention. In FIG. 6, components that are the same as those of the daylighting device of Embodiment 1 illustrated in FIG. 1 are given the same reference signs and the description thereof is omitted.

In FIG. 6, it is assumed that the X-direction is the normal direction of the first base of the daylighting device, the Y-direction is the direction (the width direction of the first base) orthogonal to the X-direction, and the Z-direction is the direction (the height direction of the first base) orthogonal to the X-direction and the Y-direction.

As illustrated in FIG. 6, a daylighting device 300 of the present embodiment is used by being attached to the existing window glass 100. The daylighting device 300 includes the first base 11 that is light-transmissive, the first spacer 12 that is provided at the outer edge of the one surface 11a of the first base 11 and attached to the window glass 100, the daylighting member 13 that is provided on the one surface 11a of the first base 11, and a Low-E film 310 that is formed between the first base 11 and the daylighting member 13.

The Low-E film 310 is formed on the one surface 11a of the first base 11 and the daylighting member 13 is provided on the Low-E film 310. As illustrated in FIG. 6, the Low-E film 310 is preferably covered with the daylighting member 13 via the adhesive layer 16 on the one surface 11a of the first base 11. That is, the daylighting member 13 is provided, via the adhesive layer 16, on a surface 310a of the Low-E film 310, which is opposite to a surface contacting the one surface 11a of the first base 11.

Here, what the Low-E film 310 is covered with the daylighting member 13 on the one surface 11a of the first base 11 means that when viewed from the one surface 11a side of the first base 11, an area of the daylighting member 13 is larger than an area of the Low-E film 310 and the daylighting member 13 is provided on the Low-E film 310 so that the Low-E film 310 is not protruded from an outer edge of the daylighting member 13.

The Low-E film 310 is a heat-ray shielding film formed by stacking a first oxide film, a silver (Ag) film, and a second oxide film in this order. The first oxide film is formed of metal oxide such as tin oxide, zinc oxide, titanium oxide, tungsten oxide, antimony-containing tin oxide, or tin-containing indium oxide. The second oxide film is formed of metal oxide such as tin oxide, zinc oxide, titanium oxide, tungsten oxide, antimony-containing tin oxide, or tin-containing indium oxide. The first oxide film and the second oxide film each functions as a protection film of the silver film. The Low-E film 310 preferably has the total light transmittance of 90% or more under the provisions of JIS K7361-1. When the Low-E film 310 has the total light transmittance of 90% or more, the Low-E film 310 obtains sufficient transparency.

A thickness of the Low-E film 310 is not particularly limited as long as the total light transmittance satisfies the range described above. The thickness of the Low-E film 310 is appropriately adjusted to obtain target heat insulating properties.

According to the daylighting device 300 of the present embodiment, only by attaching the daylighting device 300 to the existing window glass 100, the daylighting device 300 is able to be installed on the window glass 100.

According to the daylighting device 300 of the present embodiment, the daylighting device is able to be installed without replacing a sash. Thus, the cost to replace the sash is not required and economic efficiency is improved. Moreover, the step of replacing the sash is able to be omitted. Thus, the step is able to be shortened and workability is improved.

A daylighting system is able to be introduced only by attaching the daylighting device 300 to the existing window glass 100. Thus, the daylighting system is able to be introduced by adding a minimal member to the window glass 100.

By forming a multiple glass structure constituted by the existing window glass 100 and the daylighting device 300, a daylighting system that is highly energy efficient and insulates heat while getting light into the room is able to be introduced.

The Low-E film 310 as the heat-ray shielding film is formed between the first base 11 and the daylighting member 13. Thus, it is possible to enhance heat insulating properties for the room.

The Low-E film 310 is covered with the daylighting member 13 on the one surface 11a of the first base 11. Thus, the daylighting member 13 is able to prevent the Low-E film 310 from directly contacting water (moisture) in the air and protect the Low-E film 310 that is easily deteriorated due to water (moisture) in the atmosphere when the Low-E film 310 is exposed to the atmosphere for a long time.

[Embodiment 4]
(Daylighting Device)

Figure 7:
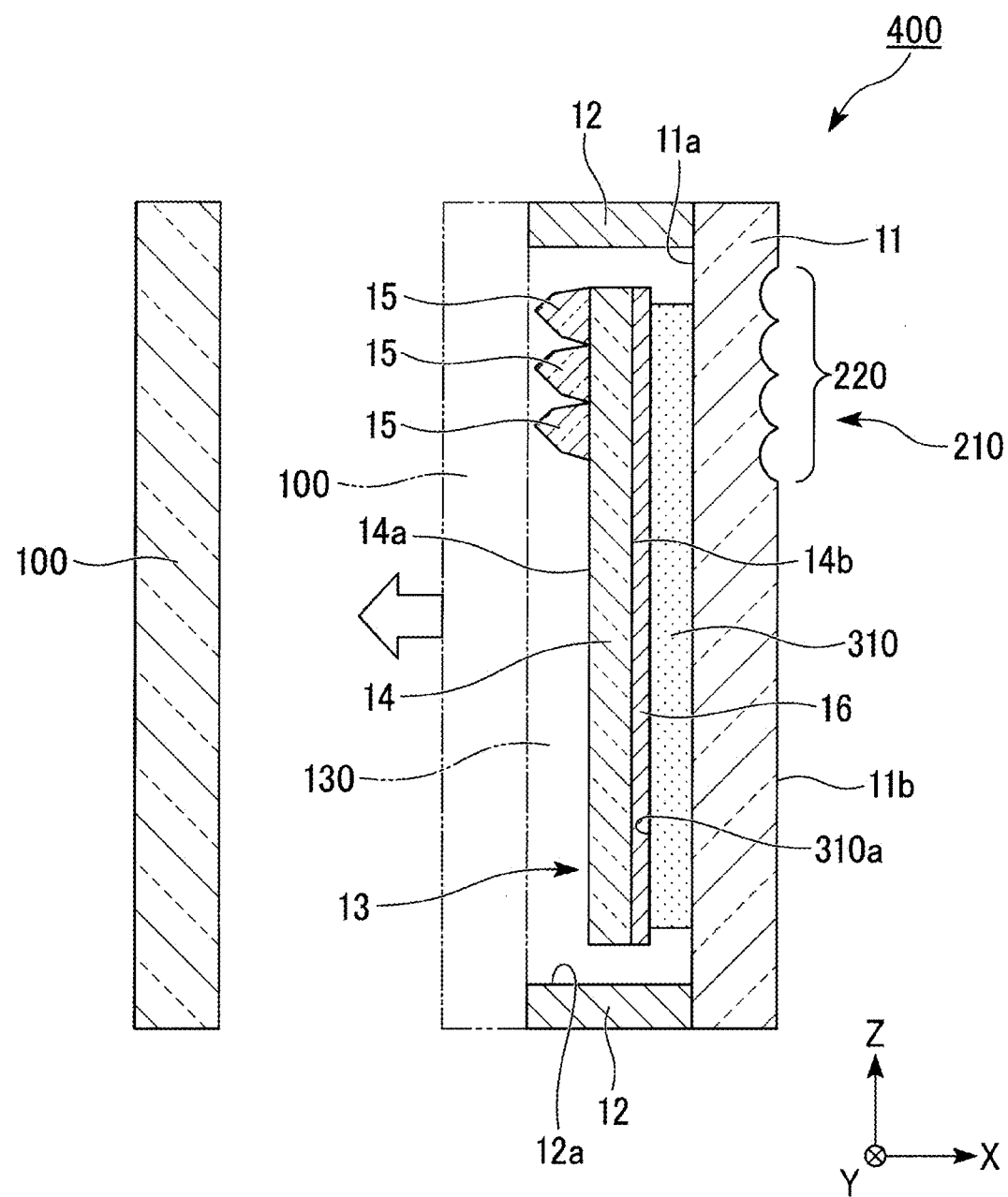
FIG. 7 is a sectional view illustrating a schematic configuration of a daylighting device that is Embodiment 4 of the invention.

FIG. 7 is a sectional view illustrating a schematic configuration of a daylighting device that is Embodiment 4 of the invention. In FIG. 7, components that are the same as those of the daylighting device of Embodiment 1 illustrated in FIG. 1, the daylighting device of Embodiment 2 illustrated in FIG. 2, and the daylighting device of Embodiment 3 illustrated in FIG. 6 are given the same reference signs and the description thereof is omitted.

In FIG. 7, it is assumed that the X-direction is the normal direction of the first base of the daylighting device, the Y-direction is the direction (the width direction of the first base) orthogonal to the X-direction, and the Z-direction is the direction (the height direction of the first base) orthogonal to the X-direction and the Y-direction.

As illustrated in FIG. 7, a daylighting device 400 of the present embodiment is used by being attached to the existing window glass 100. The daylighting device 400 includes the first base 11 that is light-transmissive, the first spacer 12 that is provided at the outer edge of the one surface 11a of the first base 11 and attached to the window glass 100, the daylighting member 13 that is provided on the one surface 11a of the first base 11, the light scattering unit 210 that is provided at the position, which faces the daylighting member 13, on the other surface 11b of the first base 11, and the Low-E film 310 that is formed between the first base 11 and the daylighting member 13.

The Low-E film 310 is formed on the one surface 11a of the first base 11 and the daylighting member 13 is provided on the Low-E film 310. As illustrated in FIG. 7, the Low-E film 310 is preferably covered with the daylighting member 13 on the one surface 11a of the first base 11.

The light scattering unit 210 is constituted by the fine unevenness 220. The light scattering unit 210 is provided at the position, which faces the daylighting member 13, on the other surface 11b of the first base 11. The light scattering unit 210 may be provided at least at the position, which faces the protrusion daylighting portions 15 constituting the daylighting member 13, on the other surface 11b of the first base 11 as illustrated in FIG. 7. In the present embodiment, the light scattering unit 210 provided on the first base 11 faces the protrusion daylighting portions 15 of the daylighting member 13 via the Low-E film 310.

According to the daylighting device 400 of the present embodiment, only by attaching the daylighting device 400 to the existing window glass 100, the daylighting device 400 is able to be installed on the window glass 100.

According to the daylighting device 400 of the present embodiment, the daylighting device is able to be installed without replacing a sash. Thus, the cost to replace the sash is not required and economic efficiency is improved. Moreover, the step of replacing the sash is able to be omitted. Thus, the step is able to be shortened and workability is improved.

A daylighting system is able to be introduced only by attaching the daylighting device 400 to the existing window glass 100. Thus, the daylighting system is able to be introduced by adding a minimal member to the window glass 100.

By forming a multiple glass structure constituted by the existing window glass 100 and the daylighting device 400, a daylighting system that is highly energy efficient and insulates heat while getting light into the room is able to be introduced.

In addition, the light scattering unit 210 is disposed at the position, which faces the daylighting member 13, on the other surface 11b of the first base 11. Thus, while the light is able to be efficiently taken on the ceiling side of the room, no glare is recognized by the person in the room.

Since the Low-E film 310 as the heat-ray shielding film is formed between the first base 11 and the daylighting member 13, it is possible to enhance heat insulating properties for the room.

(Method for Manufacturing Daylighting Device)

A method for manufacturing the daylighting device of the present embodiment will be described with reference to FIGS. 8A, 8B, 8C, 8D, 8E, and 9.

In FIGS. 8A, 8B, 8C, 8D, and 8E, components that are the same as those of the daylighting device of Embodiment 1 illustrated in FIG. 1, the daylighting device of Embodiment 2 illustrated in FIG. 2, the daylighting device of Embodiment 3 illustrated in FIG. 6, and the daylighting device of Embodiment 4 illustrated in FIG. 7 are given the same reference signs and the description thereof is omitted.

Figure 8A:
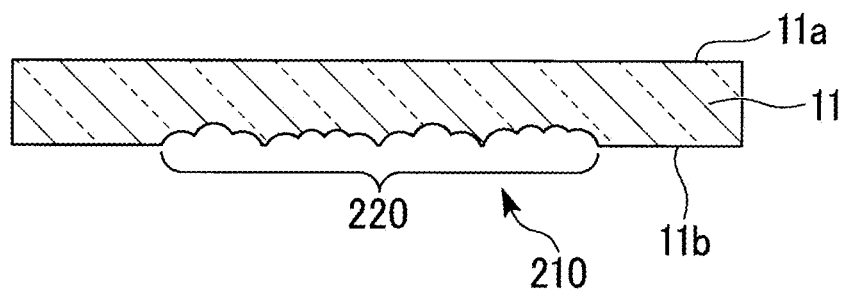
FIG. 8A is a schematic sectional view illustrating a method for manufacturing the daylighting device that is Embodiment 4 of the invention.

First, as illustrated in FIG. 8A, the light scattering unit 210 constituted by the fine unevenness 220 is formed at the position, which faces the daylighting member 13, on the other surface 11b of the first base 11. At this time, the light scattering unit 210 is formed at least at the position, which faces the protrusion daylighting portions 15 constituting the daylighting member 13, on the other surface 11b of the first base 11.

To form the fine unevenness 220 on the other surface 11b of the first base 11, for example, a method (sand blasting method) for blasting emery sand onto the other surface 11b of the first base 11, a method for polishing the other surface 11b of the first base 11, a method (wet etching method) for causing the other surface 11b of the first base 11 to corrode by a chemical treatment, or the like is used.

Figure 8B:
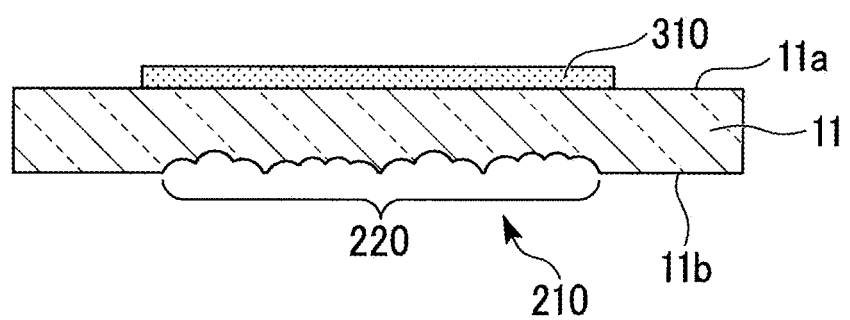
FIG. 8B is a schematic sectional view illustrating the method for manufacturing the daylighting device that is Embodiment 4 of the invention.

Next, as illustrated in FIG. 8B, the Low-E film 310 is formed on the one surface 11a of the first base 11 by a sputtering method. The Low-E film 310 is formed by stacking the first oxide film, the silver (Ag) film, and the second oxide film in this order. Thus, in order to form the Low-E film 310, first, the first oxide film is formed on the one surface 11a of the first base 11 by the sputtering method. After that, the silver film is formed on the first oxide film by the sputtering method. Then, the second oxide film is formed on the silver film by the sputtering method.

The Low-E film 310 is temporarily formed on the one surface 11a of the first base 11 by the sputtering method. However, the Low-E film 310 that is formed on a part to which a butyl rubber for attaching the spacer 12 is to be bonded, that is, the Low-E film 310 that is formed at the outer edge of the one surface 11a of the first base 11 is removed by trimming at a subsequent step.

Figure 8C:
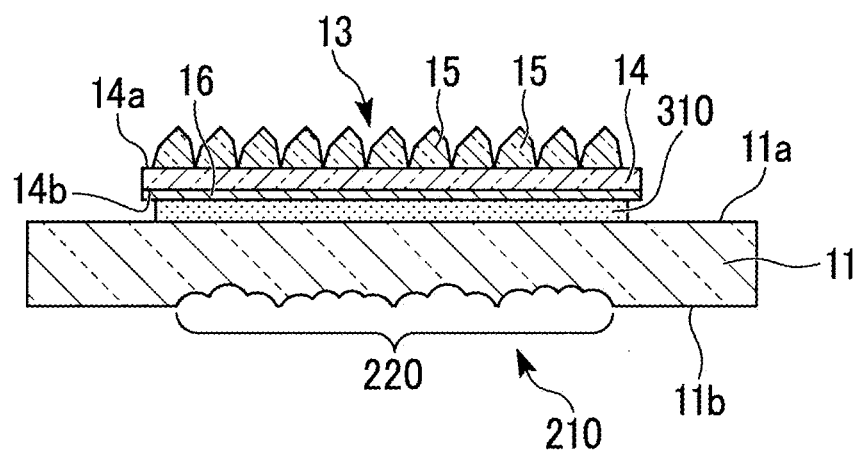
FIG. 8C is a schematic sectional view illustrating the method for manufacturing the daylighting device that is Embodiment 4 of the invention.

Next, as illustrated in FIG. 8C, by a dry laminate method or the like, the daylighting member 13 is provided so as to cover the Low-E film 310 which is formed on the one surface 11a of the first base 11.

The daylighting member 13 that includes the second base 14 that is light-transmissive and the plurality of protrusion daylighting portions 15 that are light-transmissive and provided to be adjacent to each other on the one surface 14a of the second base 14 is used. An acrylic adhesive serving as the adhesive layer 16 is applied or laminated in advance onto the other surface 14b of the second base 14.

Figure 8D:
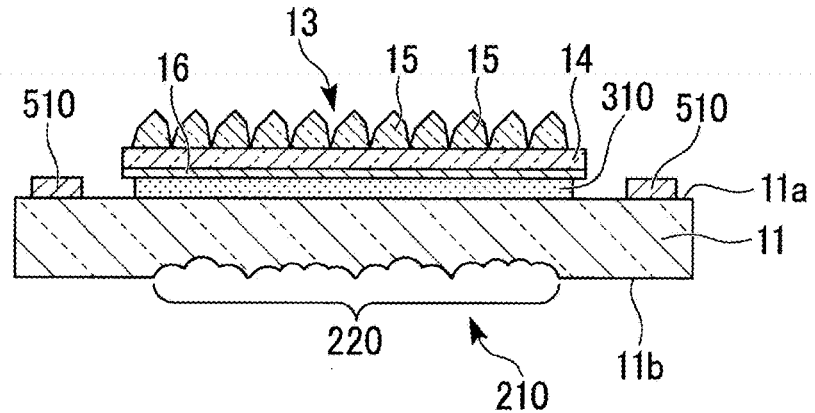
FIG. 8D is a schematic sectional view illustrating the method for manufacturing the daylighting device that is Embodiment 4 of the invention.

Further, as illustrated in FIG. 8D, a butyl rubber 510 is bonded to the outer edge (a vicinity of four sides of the first base 11 which has a rectangular shape) of the one surface 11a of the first base 11, from which the Low-E film 310 is removed by trimming.

Since it is desired that moisture is blocked after a multiple glass is made, a moisture-impermeable material is suitably used as the butyl rubber.

Figure 8E:
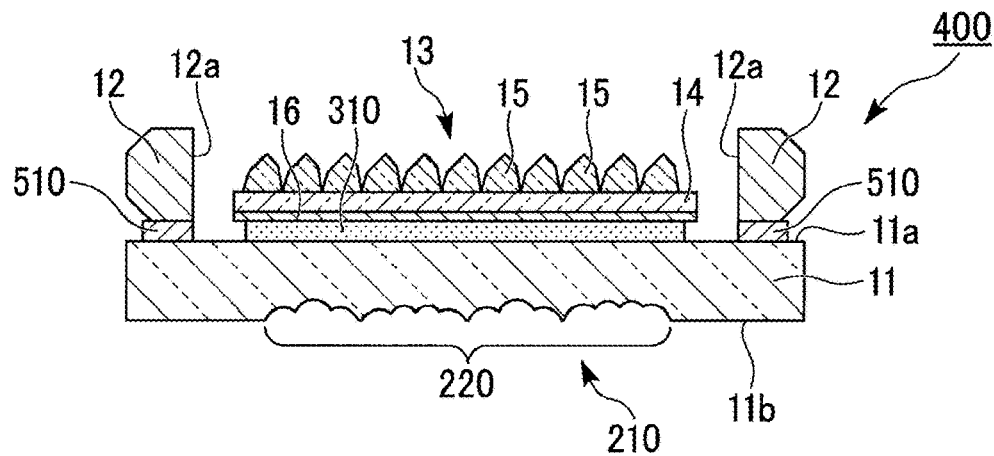
FIG. 8E is a schematic sectional view illustrating the method for manufacturing the daylighting device that is Embodiment 4 of the invention.

Next, as illustrated in FIG. 8E, the spacer 12 is attached to the outer edge of the one surface 11a of the first base 11 via the butyl rubber 510 which is bonded to the outer edge of the one surface 11a of the first base 11.

As a result, the daylighting device 400 of the present embodiment is obtained.

Figure 9:
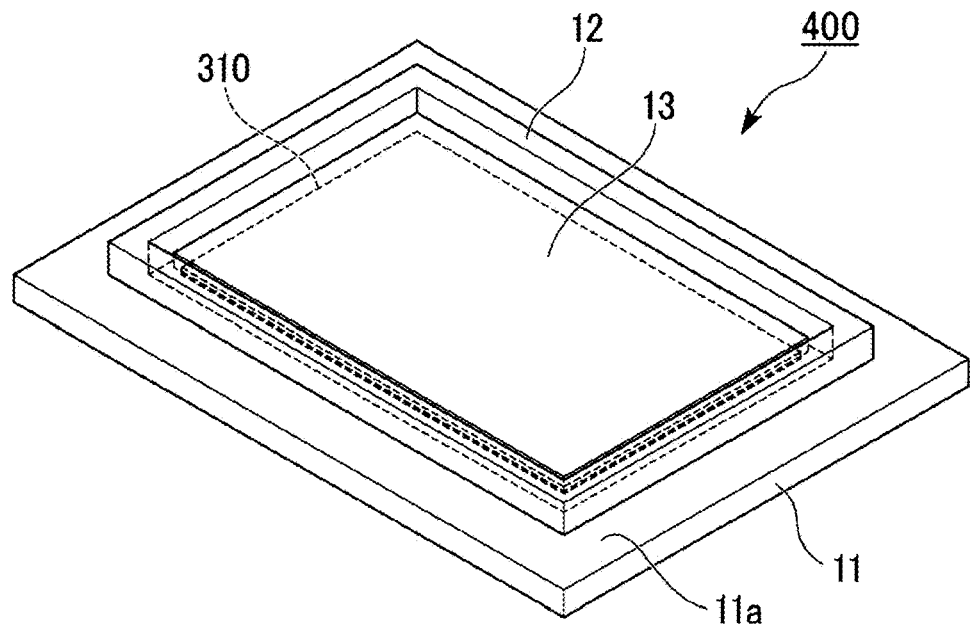
FIG. 9 is a perspective view illustrating a schematic configuration of the daylighting device that is Embodiment 4 of the invention.

In the daylighting device 400 that is obtained, the Low-E film 310 is provided on the one surface 11a of the first base 11 and the lighting member 13 is provided so as to cover the Low-E film 310 as illustrated in FIG. 9. Moreover, the spacer 12 is provided on the one surface 11a of the first base 11 so as to surround an outer edge of a laminated body constituted by the Low-E film 310 and the daylighting member 13.

(Installation Method of Daylighting Device)

Figure 10A:
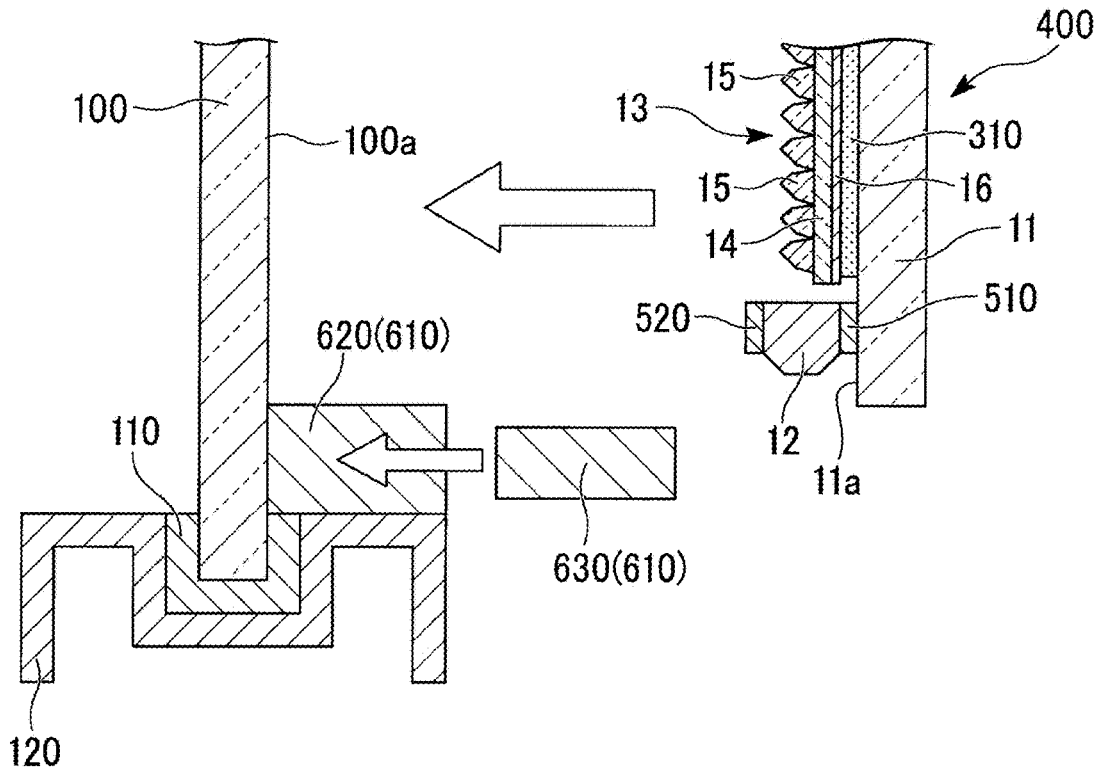
FIG. 10A is a schematic sectional view illustrating an installation method of the daylighting device that is Embodiment 4 of the invention.
Figure 10B:
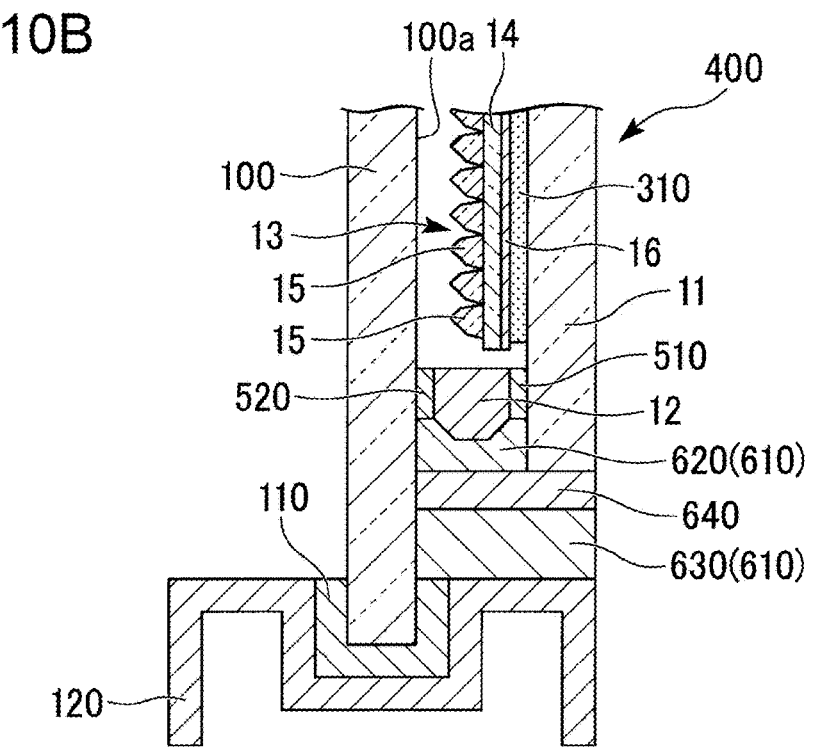
FIG. 10B is a schematic sectional view illustrating the installation method of the daylighting device that is Embodiment 4 of the invention.

With reference to FIGS. 10A and 10B, a method for manufacturing the daylighting device of the present embodiment will be described.

The window glass 100 to which the daylighting device 400 is to be attached is supported by the window frame 110.

The window frame 110 is supported by a sash 120.

To attach the daylighting device 400 to the window glass 100, first, as illustrated in FIG. 10A, a butyl rubber 520 is bonded to a surface, which is opposite to a surface to which the butyl rubber 510 is bonded, at an outer edge of the spacer 12. As the butyl rubber 520, one similar to the butyl rubber 510 is used.

Next, as illustrated in FIG. 10A, the daylighting device 400 is disposed with an interval from the window glass 100 so that the spacer 12 faces one surface (surface on the inside of the room) 100a of the window glass 100.

Further, as illustrated in FIG. 10A, a sponge rubber 610 is attached so as to be held between the window glass 100 and the daylighting device 400 along the window glass 100 and an outer edge (four sides) of the daylighting device 400. At this time, as illustrated in FIG. 10A, two types of sponge rubbers 620 and 630 (a first sponge rubber 620 and a second sponge rubber 630) having different heights are attached in places (with intervals) to the widow glass 100 and the outer edge of the daylighting device 400. Thereby, a gap between the window glass 100 and the daylighting device 400 is prevented from being eliminated, resulting that a gap between the daylighting device 400 and the sponge rubber 610 is prevented from being eliminated. That is, the first sponge rubber 620 that has a great thickness (high height) is provided, so that a gap is formed between the second sponge rubber 630 that has a small thickness (low height) and the daylighting device 400. The gap is used when a secondary sealing material 640, such as a butyl rubber, in addition to the butyl rubber 510 for attaching the spacer 12 to the one surface 11a of the first base 11, is poured into the gap between the window glass 100 and the daylighting device 400 at a subsequent step.

Next, as illustrated in FIG. 10B, at the same time with attachment of the sponge rubber 610, the daylighting device 400 is made close to the window glass 100 so as to be parallel to each other, and the daylighting device 400 is pressed against the window glass 100 so that the daylighting device 400 is pressure-bonded to the window glass 100. After that, the secondary sealing material 640 such as a butyl rubber is poured into the gap between the window glass 100 and the daylighting device 400. Thereby, a multiple glass structure constituted by the existing window glass 100 and the daylighting device 400 is formed.

By attaching the daylighting device 400 to the existing window glass 100 in this manner, the daylighting device 400 is able to be installed on the window glass 100.

According to the daylighting device 400 of the present embodiment, the daylighting device is able to be installed without replacing a sash. Thus, the cost to replace the sash is not required and economic efficiency is improved. Moreover, the step of replacing the sash is able to be omitted. Thus, the step is able to be shortened and workability is improved.

A daylighting system is able to be introduced only by attaching the daylighting device 400 to the existing window glass 100. Thus, the daylighting system is able to be introduced by adding a minimal member to the window glass 100.

By forming a multiple glass structure constituted by the existing window glass 100 and the daylighting device 400, a daylighting system that is highly energy efficient and insulates heat while getting light into the room is able to be introduced.

[Embodiment 5]

(Daylighting Device)

Figure 11:
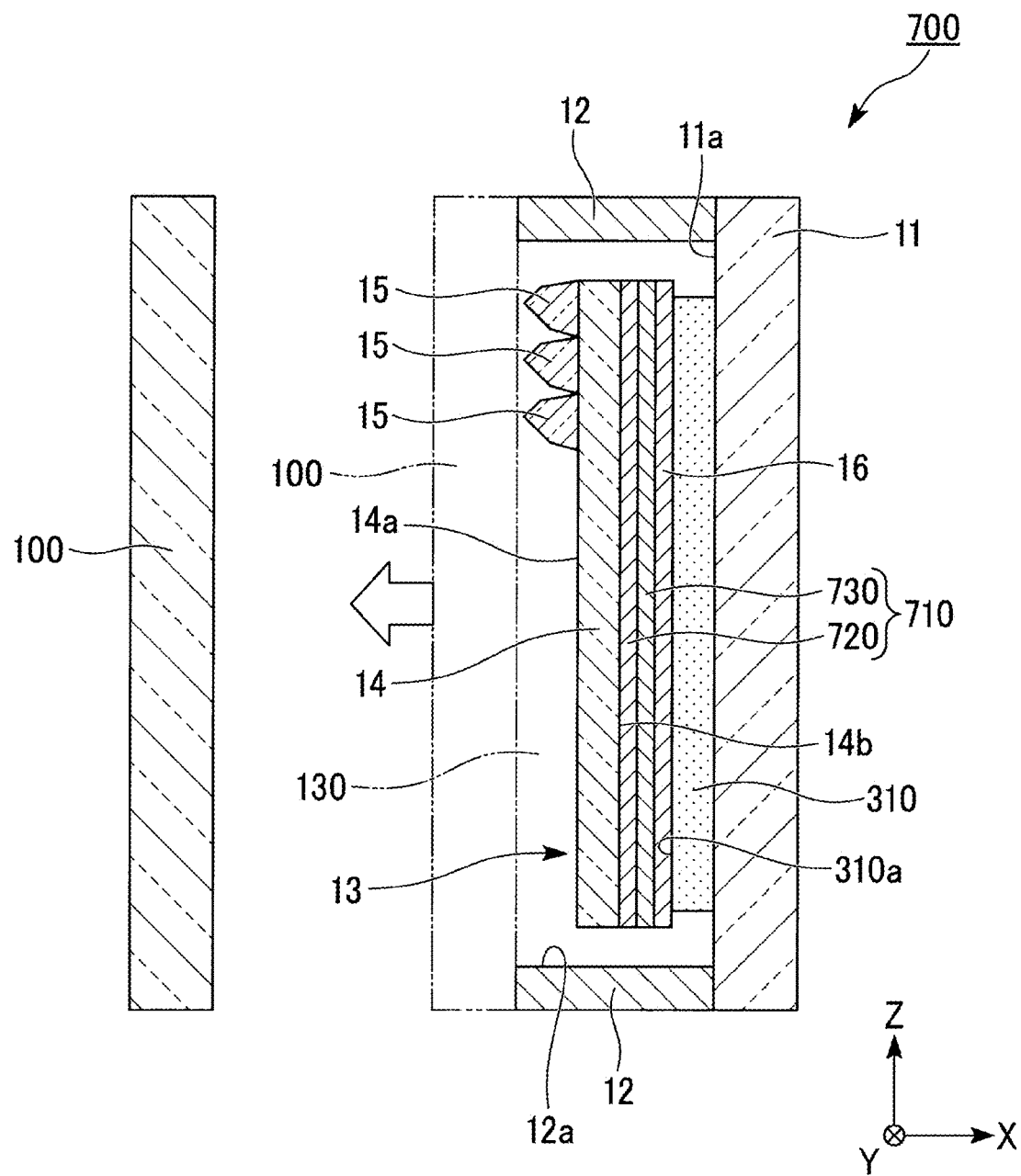
FIG. 11 is a sectional view illustrating a schematic configuration of a daylighting device that is Embodiment 5 of the invention.

FIG. 11 is a sectional view illustrating a schematic configuration of a daylighting device that is Embodiment 5 of the invention. In FIG. 11, components that are the same as those of the daylighting device of Embodiment 1 illustrated in FIG. 1 and the daylighting device of Embodiment 3 illustrated in FIG. 6 are given the same reference signs and the description thereof is omitted.

In FIG. 11, it is assumed that the X-direction is the normal direction of the first base of the daylighting device, the Y-direction is the direction (the width direction of the first base) orthogonal to the X-direction, and the Z-direction is the direction (the height direction of the first base) orthogonal to the X-direction and the Y-direction.

As illustrated in FIG. 11, a daylighting device 700 of the present embodiment is used by being attached to the existing window glass 100. The daylighting device 700 includes the first base 11 that is light-transmissive, the first spacer 12 that is provided at the outer edge of the one surface 11a of the first base 11 and attached to the window glass 100, the daylighting member 13 that is provided on the one surface 11a of the first base 11, the Low-E film 310 that is formed between the first base 11 and the daylighting member 13, and a gas barrier layer 710 that is stacked on a surface of the daylighting member 13, which faces the Low-E film 310.

In the daylighting device 700 of the present embodiment, the gas barrier layer 710 is provided between the daylighting member 13 and the Low-E film 310.

The gas barrier layer 710 is constituted by a first gas barrier layer 720 and a second gas barrier layer 730 that are stacked in order on the other surface 14b of the second base 14 which constitutes the daylighting member 13. The gas barrier layer 710 is provided to apply water vapor barrier performance to the second base 14. Moreover, as illustrated in FIG. 11, it is preferable that the Low-E film 310 is covered with the gas barrier layer 710 via the adhesive layer 16 on the one surface 11a of the first base 11. That is, the daylighting member 13 provided with the gas barrier layer 710 is formed, via the adhesive layer 16, on a surface 310a of the Low-E film 310, which is opposite to a surface contacting the one surface 11a of the first base 11. This makes it possible to prevent the Low-E film 310 covered with the gas barrier layer 710 provided on the second base 14 from being exposed to water vapor.

The first gas barrier layer 720 is an inorganic vapor deposition barrier layer formed by a vapor deposition method on the other surface 14b of the second base 14. The inorganic vapor deposition barrier layer is formed of aluminum oxide, silicon oxide, or the like.

The second gas barrier layer 730 is formed by stacking (bonding) a barrier resin film and a barrier resin coat film on the first gas barrier layer 720 formed on the other surface 14b of the second base 14.

As the barrier resin film, for example, a film formed of barrier resin such as ethylene-vinyl alcohol copolymer resin, polyvinyl alcohol, or barrier nylon is used.

As the barrier resin coat film, for example, a film formed of polyvinylidene chloride or the like is used.

According to the daylighting device 700 of the present embodiment, only by attaching the daylighting device 700 to the existing window glass 100, the daylighting device 700 is able to be installed on the window glass 100.

According to the daylighting device 700 of the present embodiment, the daylighting device is able to be installed without replacing a sash. Thus, the cost to replace the sash is not required and economic efficiency is improved. Moreover, the step of replacing the sash is able to be omitted. Thus, the step is able to be shortened and workability is improved.

A daylighting system is able to be introduced only by attaching the daylighting device 700 to the existing window glass 100. Thus, the daylighting system is able to be introduced by adding a minimal member to the window glass 100.

By forming a multiple glass structure constituted by the existing window glass 100 and the daylighting device 700, a daylighting system that is highly energy efficient and insulates heat while getting light into the room is able to be introduced.

The Low-E film 310 as the heat-ray shielding film is formed between the first base 11 and the daylighting member 13. Thus, it is possible to enhance heat insulating properties for the room.

The gas barrier layer 710 constituted by the first gas barrier layer 720 and the second gas barrier layer 730 is stacked on the other surface 14b of the second base 14 which constitutes the daylighting member 13. Thus, the gas barrier layer 710 prevents the Low-E film 310 from directly contacting water (moisture) in the air and is able to further enhance an effect of protecting the Low-E film 310 that is easily deteriorated due to water (moisture) in the atmosphere when the Low-E film 310 is exposed to the atmosphere for a long time.

[Embodiment 6]
(Daylighting Device)

Figure 12:
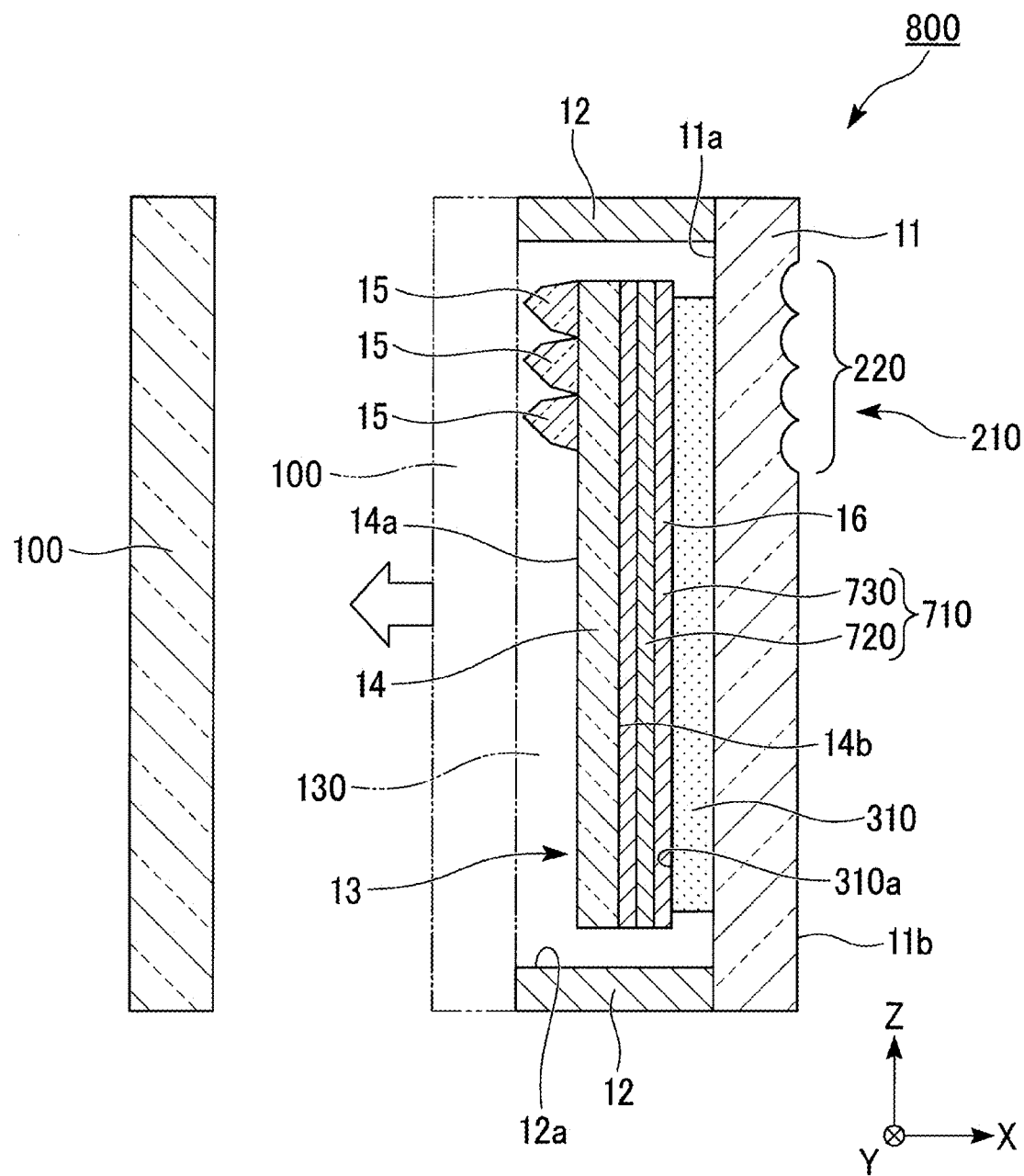
FIG. 12 is a sectional view illustrating a schematic configuration of a daylighting device that is Embodiment 6 of the invention.

FIG. 12 is a sectional view illustrating a schematic configuration of a daylighting device that is Embodiment 6 of the invention. In FIG. 12, components that are the same as those of the daylighting device of Embodiment 1 illustrated in FIG. 1, the daylighting device of Embodiment 2 illustrated in FIG. 2, the daylighting device of Embodiment 3 illustrated in FIG. 6, and the daylighting device of Embodiment 5 illustrated in FIG. 11 are given the same reference signs and the description thereof is omitted.

In FIG. 12, it is assumed that the X-direction is the normal direction of the first base of the daylighting device, the Y-direction is the direction (the width direction of the first base) orthogonal to the X-direction, and the Z-direction is the direction (the height direction of the first base) orthogonal to the X-direction and the Y-direction.

As illustrated in FIG. 12, a daylighting device 800 of the present embodiment is used by being attached to the existing window glass 100. The daylighting device 800 includes the first base 11 that is light-transmissive, the first spacer 12 that is provided at the outer edge of the one surface 11a of the first base 11 and attached to the window glass 100, the daylighting member 13 that is provided on the one surface 11a of the first base 11, the Low-E film 310 that is formed between the first base 11 and the daylighting member 13, the gas barrier layer 710 that is stacked on the surface of the daylighting member 13, which faces the Low-E film 310, and the light scattering unit 210 that is provided at the position, which faces the daylighting member 13, on the other surface 11b of the first base 11.

The light scattering unit 210 is provided at the position, which faces the daylighting member 13, on the other surface 11b of the first base 11, but may be provided at least at a position, which faces the protrusion daylighting portions 15 constituting the daylighting member 13, on the other surface 11b of the first base 11 as illustrated in FIG. 12. In the present embodiment, the light scattering unit 210 provided on the first base 11 faces the protrusion daylighting portions 15 of the daylighting member 13 via the Low-E film 310.

According to the daylighting device 800 of the present embodiment, only by attaching the daylighting device 800 to the existing window glass 100, the daylighting device 800 is able to be installed on the window glass 100.

According to the daylighting device 800 of the present embodiment, the daylighting device is able to be installed without replacing a sash. Thus, the cost to replace the sash is not required and economic efficiency is improved. Moreover, the step of replacing the sash is able to be omitted. Thus, the step is able to be shortened and workability is improved.

A daylighting system is able to be introduced only by attaching the daylighting device 800 to the existing window glass 100. Thus, the daylighting system is able to be introduced by adding a minimal member to the window glass 100.

By forming a multiple glass structure constituted by the existing window glass 100 and the daylighting device 800, a daylighting system that is highly energy efficient and insulates heat while getting light into the room is able to be introduced.

In addition, the light scattering unit 210 is disposed at the position, which faces the daylighting member 13, on the other surface 11b of the first base 11. Thus, while the light is able to be efficiently taken on the ceiling side of the room, no glare is recognized by the person in the room.

The Low-E film 310 as the heat-ray shielding film is formed between the first base 11 and the daylighting member 13. Thus, it is possible to enhance heat insulating properties for the room.

The gas barrier layer 710 constituted by the first gas barrier layer 720 and the second gas barrier layer 730 is stacked on the other surface 14b of the second base 14 which constitutes the daylighting member 13. Thus, the gas barrier layer 710 prevents the Low-E film 310 from directly contacting water (moisture) in the air and is able to further enhance an effect of protecting the Low-E film 310 that is easily deteriorated due to water (moisture) in the atmosphere when the Low-E film 310 is exposed to the atmosphere for a long time.

[Embodiment 7]
(Daylighting Device)

Figure 13:
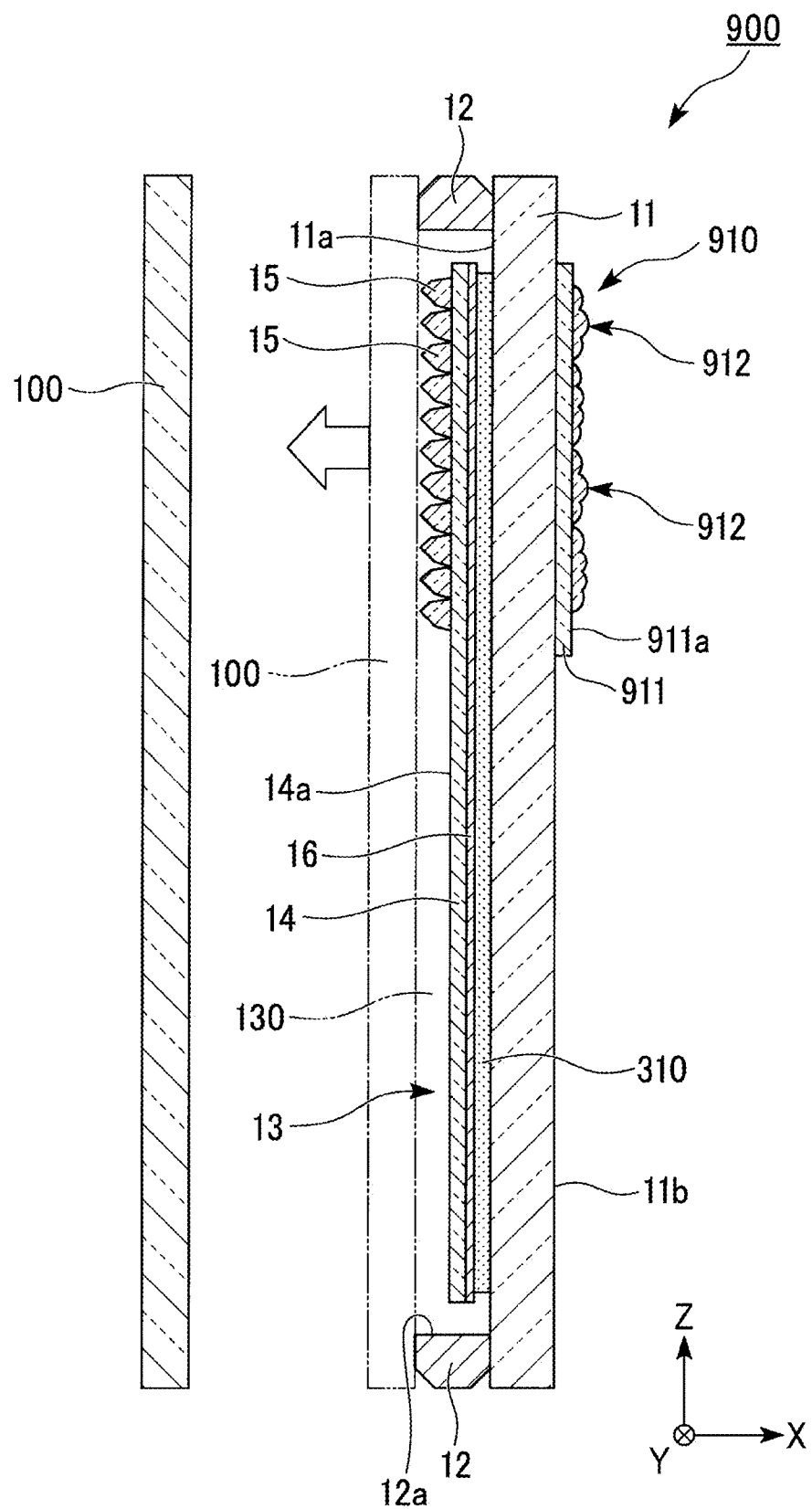
FIG. 13 is a sectional view illustrating a schematic configuration of a daylighting device that is Embodiment 7 of the invention.

FIG. 13 is a sectional view illustrating a schematic configuration of a daylighting device that is Embodiment 7 of the invention. In FIG. 13, components that are the same as those of the daylighting device of Embodiment 1 illustrated in FIG. 1 and the daylighting device of Embodiment 3 illustrated in FIG. 6 are given the same reference signs and the description thereof is omitted.

In FIG. 13, it is assumed that the X-direction is the normal direction of the first base of the daylighting device, the Y-direction is the direction (the width direction of the first base) orthogonal to the X-direction, and the Z-direction is the direction (the height direction of the first base) orthogonal to the X-direction and the Y-direction.

As illustrated in FIG. 13, a daylighting device 900 of the present embodiment is used by being attached to the existing window glass 100. The daylighting device 900 includes the first base 11 that is light-transmissive, the first spacer 12 that is provided at the outer edge of the one surface 11a of the first base 11 and attached to the window glass 100, the daylighting member 13 that is provided on the one surface 11a of the first base 11, the Low-E film 310 that is formed between the first base 11 and the daylighting member 13, and a light scattering member 910 that is provided at a position, which faces the daylighting member 13, on the other surface 11b of the first base 11.

The light scattering member 910 includes a base 911 that is light-transmissive and a plurality of light scattering units 912 that are light-transmissive and provided to be adjacent to each other on one surface 911a of the base 911.

The light scattering units 912 are provided at a part of the one surface 911a of the base 911, which is disposed on an upper side in a vertical direction (up-and-down direction) when the daylighting device 900 is attached to the window glass 100. Edges of the light scattering units 912 which are adjacent to each other are in contact.

According to the daylighting device 900 of the present embodiment, only by attaching the daylighting device 900 to the existing window glass 100, the daylighting device 900 is able to be installed on the window glass 100.

According to the daylighting device 900 of the present embodiment, the daylighting device is able to be installed without replacing a sash. Thus, the cost to replace the sash is not required and economic efficiency is improved. Moreover, the step of replacing the sash is able to be omitted. Thus, the step is able to be shortened and workability is improved.

A daylighting system is able to be introduced only by attaching the daylighting device 900 to the existing window glass 100. Thus, the daylighting system is able to be introduced by adding a minimal member to the window glass 100.

By forming a multiple glass structure constituted by the existing window glass 100 and the daylighting device 900, a daylighting system that is highly energy efficient and insulates heat while getting light into the room is able to be introduced.

In addition, the light scattering member 910 is provided at the position, which faces the daylighting member 13, on the other surface 11b of the first base 11. Thus, while the light is able to be efficiently taken on the ceiling side of the room, no glare is recognized by the person in the room.

The Low-E film 310 as the heat-ray shielding film is formed between the first base 11 and the daylighting member 13. Thus, it is possible to enhance heat insulating properties for the room.

Note that, though the case where the edges of the light scattering units 912 which are adjacent to each other are in contact is exemplified in the present embodiment, the present embodiment is not limited thereto. In the present embodiment, the edges of the light scattering units 912 which are adjacent to each other may be connected so that the light scattering units 912 which are adjacent to each other have end surfaces on the base 911 side overlapped partially. Moreover, in all the light scattering units 912 which are adjacent to each other, the light scattering units 912 which are adjacent to each other may not be partially in contact. For example, in a part of the light scattering units 912 of the plurality of light scattering units 912, a set of the light scattering units 912 which are adjacent to each other may be partially in contact. That is, it is only required that the plurality of light scattering units 912 have a configuration in which a set of the light scattering units 912 which are adjacent to each other is partially in contact.

The daylighting device 900 of the present embodiment may be provided with the gas barrier layer described above.

[Embodiment 8]
(Daylighting Device)

Figure 14:
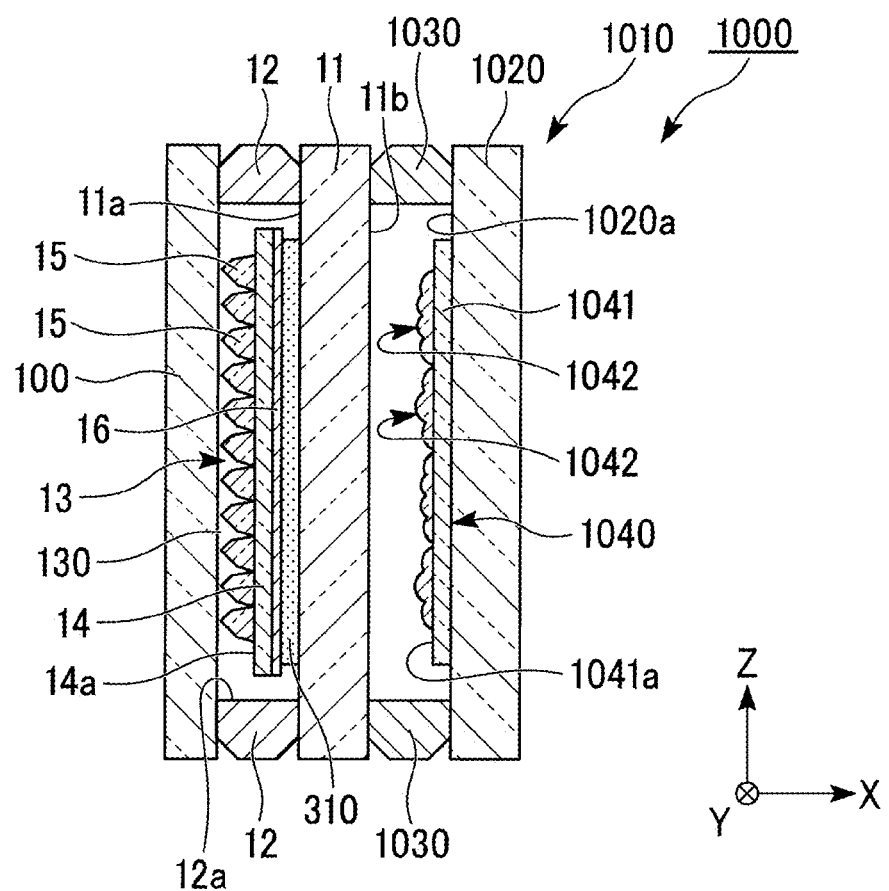
FIG. 14 is a sectional view illustrating a schematic configuration of a daylighting device that is Embodiment 8 of the invention.

FIG. 14 is a sectional view illustrating a schematic configuration of a daylighting device that is Embodiment 8 of the invention. In FIG. 14, components that are the same as those of the daylighting device of Embodiment 1 illustrated in FIG. 1, the daylighting device of Embodiment 3 illustrated in FIG. 6, and the daylighting device of Embodiment 7 illustrated in FIG. 13 are given the same reference signs and the description thereof is omitted.

In FIG. 14, it is assumed that the X-direction is the normal direction of the first base of the daylighting device, the Y-direction is the direction (the width direction of the first base) orthogonal to the X-direction, and the Z-direction is the direction (the height direction of the first base) orthogonal to the X-direction and the Y-direction.

As illustrated in FIG. 14, a daylighting device 1000 of the present embodiment is used by being attached to the existing window glass 100. The daylighting device 1000 includes the first base 11 that is light-transmissive, the first spacer 12 that is provided at the outer edge of the one surface 11a of the first base 11 and attached to the window glass 100, the daylighting member 13 that is provided on the one surface 11a of the first base 11, the Low-E film 310 that is formed between the first base 11 and the daylighting member 13, and a light scattering device 1010 attached to the other surface 11b of the first base 11.

The light scattering device 1010 includes a third base 1020 that is light-transmissive, a second spacer 1030 that is provided at an outer edge of a surface (hereinafter, referred to as "one surface") 1020a of the third base 1020, which faces the first base 11, and a light scattering member 1040.

The light scattering member 1040 includes a base 1041 that is light-transmissive and a plurality of light scattering units 1042 that are light-transmissive and provided to be adjacent to each other on one surface 1041a of the base 1041.

The plurality of light scattering units 1042 are provided so that edges of the light scattering units 1042 which are adjacent to each other are in contact.

The light scattering device 1010 is attached, via the second spacer 1030, to the other surface 11b of the first base 11 so that the light scattering units 1042 face the first base 11.

According to the daylighting device 1000 of the present embodiment, only by attaching the daylighting device 1000 to the existing window glass 100, the daylighting device 1000 is able to be installed on the window glass 100.

According to the daylighting device 1000 of the present embodiment, the daylighting device is able to be installed without replacing a sash. Thus, the cost to replace the sash is not required and economic efficiency is improved. Moreover, the step of replacing the sash is able to be omitted. Thus, the step is able to be shortened and workability is improved.

A daylighting system is able to be introduced only by attaching the daylighting device 1000 to the existing window glass 100. Thus, the daylighting system is able to be introduced by adding a minimal member to the window glass 100.

By forming a multiple glass structure constituted by the existing window glass 100 and the daylighting device 1000, a daylighting system that is highly energy efficient and insulates heat while getting light into the room is able to be introduced.

In addition, the light scattering device 1010 is attached, via the second spacer 1030, to the other surface 11b of the first base 11 so that the light scattering member 13 faces the light scattering units 1042. Thus, while the light is able to be efficiently taken on the ceiling side of the room, no glare is recognized by the person in the room.

The Low-E film 310 as the heat-ray shielding film is formed between the first base 11 and the daylighting member 13. Thus, it is possible to enhance heat insulating properties for the room.

[Daylighting System]

Figure 15:
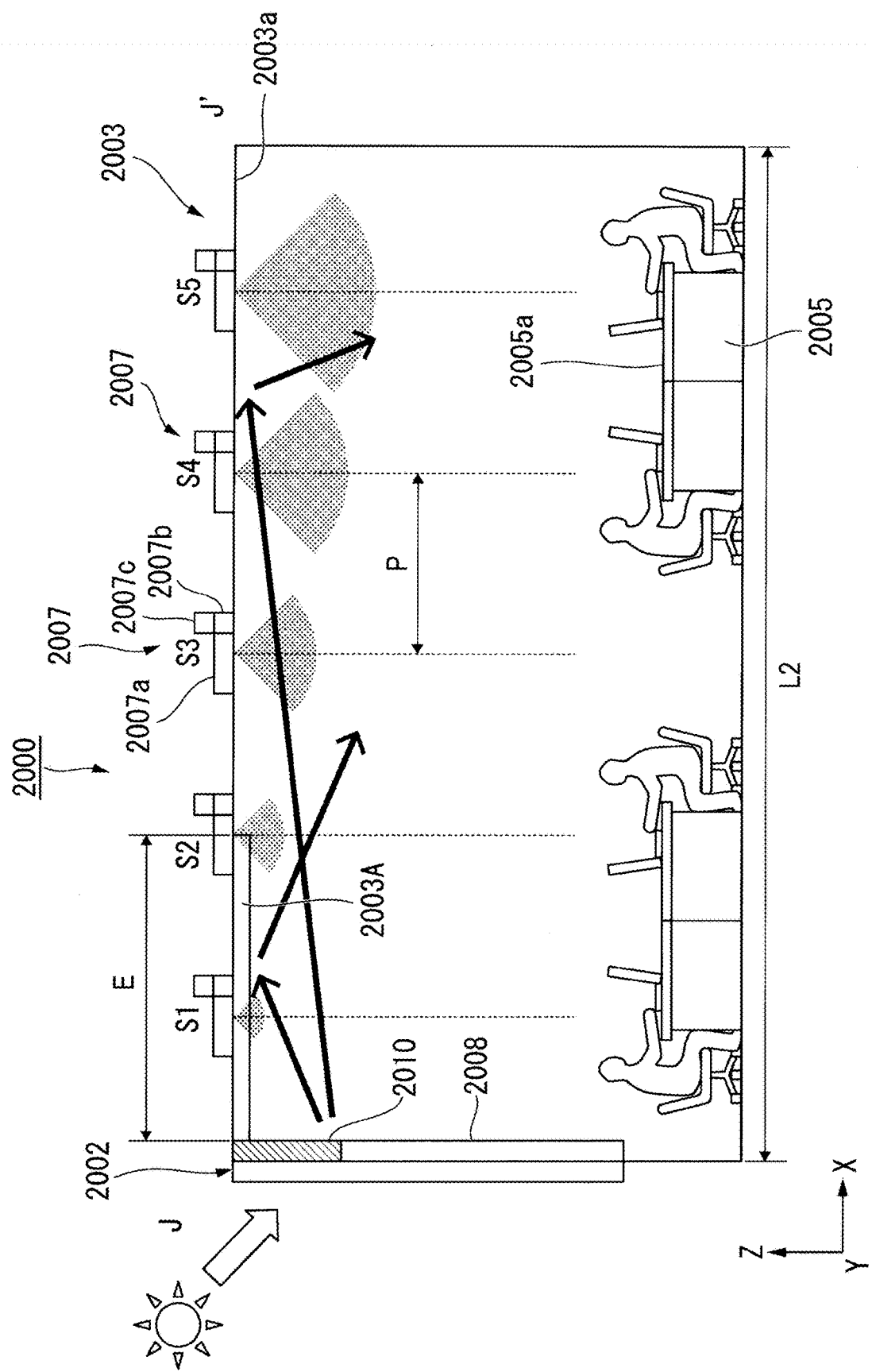
FIG. 15 illustrates a room model having a daylighting device and a lighting control system and is a sectional view taken along a line J-J' of FIG. 16.
Figure 16:
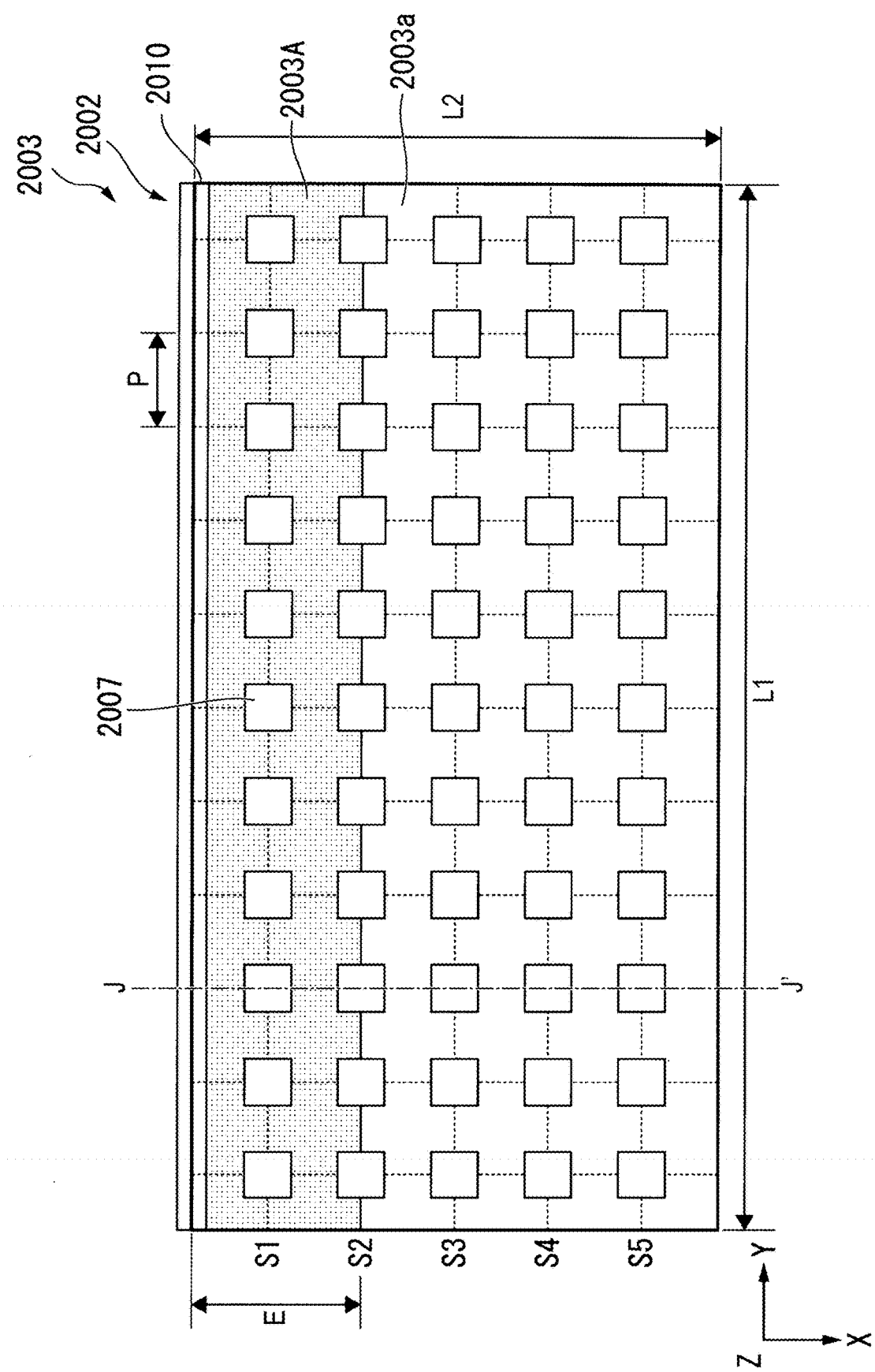
FIG. 16 is a plan view illustrating a ceiling of the room model.

FIG. 15 illustrates a room model 2000 having a daylighting device and a lighting control system and is a sectional view taken along a line J-J' of FIG. 16. FIG. 16 is a plan view illustrating a ceiling of the room model 2000.

In the room model 2000, a ceiling material constituting a ceiling 2003a of a room 2003 into which external light is guided may have high light reflectivity. As illustrated in FIGS. 15 and 16, a light-reflective ceiling material 2003A is installed on the ceiling 2003a of the room 2003 as a ceiling material having light reflectivity. The light-reflective ceiling material 2003A is used for the purpose of promoting the guiding of external light from a daylighting device 2010 installed on a window 2002 into deep inside the room, and therefore installed on the ceiling 2003a on a window side. Specifically, the light-reflective ceiling material 2003A is installed in a predetermined area E (an area within about 3 m from the window 2002) of the ceiling 2003a.

As described above, the light-reflective ceiling material 2003A functions to efficiently guide, to deep inside the room, external light which is guided into the room through the window 2002 on which the lighting device 2010 (the daylighting device of any embodiment described above) is installed. The external light guided to the ceiling 2003a in the room from the daylighting device 2010 is reflected by the light-reflective ceiling material 2003A and a direction of the light is changed to illuminate a desk top surface 2005a of a desk 2005 which is placed in the deep inside of the room, so that an effect of making the desk top surface 2005a bright is exhibited.

The light-reflective ceiling material 2003A may have diffusion reflectivity or may have specular reflectivity, but preferably has both properties mixed appropriately in order to achieve both the effect of making the desk top surface 2005a of the desk 2005 placed in the deep inside of the room bright and the effect of suppressing glare light uncomfortable for a person in the room.

Though most of the light guided into the room by the daylighting device 2010 travels to the ceiling near the window 2002, an amount of light is sufficient near the window 2002 in many cases. Thus, the light-reflective ceiling material 2003A as described above is used in combination, and thereby it is possible to allocate the light incident on the ceiling (area E) near the window to the deep inside of the room where an amount of light is less than that near the window side.

The light-reflective ceiling material 2003A is able to be created, for example, by embossing a metal plate made of aluminum or the like with unevenness of about several tens of microns or by applying vapor deposition of a metal thin film made of aluminum or the like to a surface of a resin base on which similar unevenness is formed. Alternatively, unevenness may be formed by embossing a curved surface with longer intervals.

Further, by appropriately changing an embossing shape to be formed on the light-reflective ceiling material 2003A, it is possible to control light distribution characteristics of light and distribution of light in the room. For example, when the embossment is performed in a stripe shape extending to deep inside the room, the light reflected by the light-reflective ceiling material 2003A expands in a right-and-left direction (a direction intersecting a longitudinal direction of unevenness) of the window 2002. When a size and a direction of the window 2002 of the room 2003 are limited, by using such a property, it is possible to diffuse the light in a horizontal direction and reflect the light toward deep inside the room by the light-reflective ceiling material 2003A.

The daylighting device 2010 is used as a part of a lighting control system of the room 2003. The lighting control system is constituted by components of the entire room, for example, including the daylighting device 2010, a plurality of indoor lighting devices 2007, a solar radiation adjustment device 2008 installed on the window, a control system for those components, and the light-reflective ceiling material 2003A provided on the ceiling 2003a.

The window 2002 of the room 2003 has the daylighting device 2010 provided on an upper side thereof and has the solar radiation adjustment device 2008 provided on a lower side thereof. Here, a blind is installed as the solar radiation adjustment device 2008, but there is no limitation thereto.

In the room 2003, the plurality of indoor lighting devices 2007 are arranged in a lattice manner in the right-and-left direction (Y-direction) of the window 2002 and in a depth direction (X-direction) of the room. The plurality of indoor lighting devices 2007 constitute the entire lighting system of the room 2003 along with the daylighting device 2010.

As illustrated in FIGS. 15 and 16, for example, the ceiling 2003a of an office in which a length $L_1$ of the window 2002 in the right-and-left direction (Y-direction) is 18 m and a length $L_2$ of the room 2003 in the depth direction (X-direction) is 9 m is illustrated. Here, the indoor lighting devices 2007 are arranged in a lattice manner at each interval P of 1.8 m in a horizontal direction (Y-direction) and a depth direction (X-direction) of the ceiling 2003a.

More specifically, fifty indoor lighting devices 2007 are arrayed with 10 rows (Y-direction)×5 columns (X-direction).

Each of the indoor lighting devices 2007 includes indoor lighting equipment (indoor lighting tool) 2007a, a brightness detection unit 2007*b*, and a control unit 2007*c*, and is formed with the brightness detection unit 2007*b* and the control unit 2007*c* integrated with the indoor lighting equipment 2007*a*.

The indoor lighting devices 2007 may include a plurality of pieces of indoor lighting equipment 2007*a* and a plurality of brightness detection units 2007*b*. However, one brightness detection unit 2007*b* is provided for each piece of indoor lighting equipment 2007*a*. The brightness detection unit 2007*b* receives light reflected by a surface to be illuminated by the indoor lighting equipment 2007*a* and detects illuminance of the illuminated surface. Here, the illuminance of the desk top surface 2005*a* of the desk 2005 placed in the room is detected by the brightness detection unit 2007*b*.

The control units 2007*c* each of which is provided in each of the indoor lighting devices 2007 are connected to each other. Each of the indoor lighting devices 2007 performs feedback control, by the control units 2007*c* connected to each other, to adjust a light output of an LED lamp of each indoor lighting equipment 2007*a* so that the illuminance of the desk top surface 2005*a* that is detected by each brightness detection unit 2007*b* is a certain target illuminance L0 (for example, average illuminance: 750 1x).

INDUSTRIAL APPLICABILITY

Some aspects of the invention are able to be utilized by being attached to any one of an existing window glass and a window frame that supports the window glass.

REFERENCE SIGNS LIST

10, 200, 300, 400, 700, 800, 900, 1000 daylighting device
11 first base
12 first spacer
13 daylighting member
14 second base
15 protrusion daylighting portion
16 adhesive layer
100 window glass
110 window frame
130 space
210 light scattering unit
220 unevenness
230 convex lens
310 Low-E film
510, 520 butyl rubber
610 sponge rubber
620 first sponge rubber (sponge rubber)
630 second sponge rubber (sponge rubber)
640 second sealing material
710 gas barrier layer
720 first gas barrier layer
730 second gas barrier layer
910 light scattering member
911 base
912 light scattering unit
1010 light scattering device
1020 third base
1030 second spacer
1040 light scattering member
1041 base
1042 light scattering unit

The invention claimed is:
1. A daylighting device that is used by being attached to at least any one of an existing window glass and an existing window frame supporting the existing window glass, the daylighting device comprising:
a first base that is light-transmissive; a first spacer that is provided at an outer edge of a surface of the first base, the surface of the first base facing the existing window glass, and that is attached to at least any one of the existing window glass and the existing window frame; and a daylighting member that is provided on a side of the surface of the first base, the surface of the first base facing the existing window glass, wherein
the daylighting member includes a second base that is light-transmissive, and a plurality of protrusion daylighting portions that is light-transmissive and provided to be adjacent to each other on a side of a surface of the second base, the surface of the second base facing at least the existing window glass;
wherein a Low-E film is formed between the first base and the daylighting member; and
wherein the Low-E film is covered with the daylighting member on the surface of the first base, the surface of the first base facing the existing window glass;
wherein when the Low-E film is viewed from the surface of the first base facing the existing window glass, the daylighting member is larger in area than the Low-E film, and the daylighting member is provided on the Low-E film so that the Low-E film does not protrude from an outer edge of the daylighting member.

2. The daylighting device according to claim 1, wherein a gas barrier layer is stacked on a surface of the daylighting member, the surface of the daylighting member faces the Low-E film.

3. The daylighting device according to claim 1, wherein a light scattering unit that scatters light in a direction vertical to an up-and-down direction of the existing window glass is provided at a position, at which the light scattering unit faces the daylighting member, on a side of a surface opposite to the surface of the first base, the surface of the first base facing the existing window glass.

4. The daylighting device according to claim 3, further comprising
a light scattering device that has a third base being light-transmissive, a second spacer provided at an outer edge of a surface of the third base, the surface of the third base facing the first base, and a light scattering unit, wherein
the light scattering device is attached, via the second spacer, to the surface opposite to the surface of the first base, the surface of the first base facing the existing window glass, so that the light scattering unit faces the first base.

5. The daylighting device according to claim 3, wherein the light scattering unit is constituted by a fine unevenness formed on the surface opposite to the surface of the first base, the surface of the first base facing the existing window glass, and
the fine unevenness is formed along a direction that is an up-and-down direction of the first base when the first base is attached to at least any one of the existing window glass and the existing window frame via the first spacer.

6. The daylighting device according to claim 3, wherein the light scattering unit is constituted by a plurality of convex lenses provided to be parallel and adjacent to each other on the surface opposite to the surface of the first base, the surface of the first base facing the existing window glass, and the plurality of convex lenses is provided along a direction that is an up-and-down direction of the first base when the first base is attached to at least any one of the existing window glass and the existing window frame via the first spacer.

* * * * *